US010557537B2

(12) United States Patent
Keeney et al.

(10) Patent No.: US 10,557,537 B2
(45) Date of Patent: Feb. 11, 2020

(54) AXLE ASSEMBLY HAVING A GEAR REDUCTION UNIT AND AN INTERAXLE DIFFERENTIAL UNIT

(71) Applicant: ArvinMeritor Technology, LLC, Troy, MI (US)

(72) Inventors: Christopher Keeney, Troy, MI (US); Dale Eschenburg, Rochester Hills, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 0 days.

(21) Appl. No.: 16/451,772

(22) Filed: Jun. 25, 2019

(65) Prior Publication Data
US 2019/0316666 A1 Oct. 17, 2019

Related U.S. Application Data

(62) Division of application No. 15/785,537, filed on Oct. 17, 2017, now Pat. No. 10,364,872.

(51) Int. Cl.
B60K 17/36 (2006.01)
F16H 37/08 (2006.01)
B60K 17/16 (2006.01)
F16D 11/10 (2006.01)
B60K 17/346 (2006.01)
F16H 3/54 (2006.01)
(Continued)

(52) U.S. Cl.
CPC ......... F16H 37/082 (2013.01); B60K 17/16 (2013.01); B60K 17/3467 (2013.01); B60K 17/36 (2013.01); F16D 11/10 (2013.01); F16H 3/54 (2013.01); F16H 48/08 (2013.01); F16H 2048/366 (2013.01); F16H 2048/368 (2013.01); F16H 2200/0034 (2013.01); F16H 2200/2005 (2013.01)

(58) Field of Classification Search
CPC .......... F16H 37/082; F16H 3/54; F16H 48/08; F16H 2200/0034; F16H 2200/2005; B60K 17/16; B60K 17/36; F16D 11/10
USPC ....................................................... 475/204
See application file for complete search history.

(56) References Cited

U.S. PATENT DOCUMENTS 4,452,331 A 6/1984 Lunn et al.
5,284,068 A * 2/1994 Frost .................. B60K 17/3467
  475/225
6,581,745 B2 6/2003 Kanazawa
(Continued)

FOREIGN PATENT DOCUMENTS

GB 216074 A 5/1924
WO 2004009392 A1 1/2004

OTHER PUBLICATIONS

European Patent Office, Extended European Search Report for corresponding Application No. EP18198250-1012, dated Jan. 9, 2019.
(Continued)

Primary Examiner — Leslie A Nicholson, III
(74) Attorney, Agent, or Firm — Brooks Kushman P.C.

(57) ABSTRACT

An axle assembly having a gear reduction unit and an interaxle differential unit. The gear reduction unit may be operatively connected to an input shaft and may selectively provide gear reduction to a differential assembly and the interaxle differential unit. The interaxle differential unit may operatively connect the gear reduction unit to the output shaft.

20 Claims, 25 Drawing Sheets

(51) Int. Cl.
*F16H 48/08* (2006.01)
*F16H 48/36* (2012.01)

(56) References Cited

U.S. PATENT DOCUMENTS

| | | | |
|---|---|---|---|
| 6,645,110 B2 * | 11/2003 | Williams | B60K 17/3467 |
| | | | 180/247 |
| 6,884,196 B1 | 4/2005 | Ziech | |
| 6,918,851 B2 | 7/2005 | Ziech et al. | |
| 7,211,017 B2 | 5/2007 | Green et al. | |
| 7,749,124 B2 | 7/2010 | Nakajima | |
| 7,824,293 B2 | 11/2010 | Schimke | |
| 8,123,645 B2 | 2/2012 | Schimke | |
| 8,382,633 B2 | 2/2013 | Cooper et al. | |
| 8,523,738 B2 | 9/2013 | Morscheck et al. | |
| 8,911,321 B2 | 12/2014 | Ziech et al. | |
| 9,020,715 B2 | 4/2015 | Nellums et al. | |
| 9,102,232 B2 | 8/2015 | Ziech et al. | |
| 9,121,455 B2 | 9/2015 | Cooper | |
| 9,284,995 B2 | 3/2016 | Lawson et al. | |
| 9,428,050 B2 | 8/2016 | Ziech et al. | |
| 10,001,201 B2 | 6/2018 | Martin et al. | |
| 10,029,562 B2 | 7/2018 | Lammers et al. | |
| 10,156,289 B2 | 12/2018 | De Stefani et al. | |
| 2015/0051039 A1 | 2/2015 | Keeney et al. | |
| 2016/0341260 A1 | 11/2016 | Hirao | |

OTHER PUBLICATIONS

European Patent Office, Extended European Search Report for corresponding European Application No. 19196141.6-1012, dated Nov. 11, 2019.

* cited by examiner

AXLE ASSEMBLY HAVING A GEAR REDUCTION UNIT AND AN INTERAXLE DIFFERENTIAL UNIT

CROSS-REFERENCE TO RELATED APPLICATIONS

This application is a division of U.S. application Ser. No. 15/785,537, filed Oct. 17, 2017, now U.S. Pat. No. 10,364,872, the disclosure of which is hereby incorporated in its entirety by reference herein.

TECHNICAL FIELD

This disclosure relates to an axle assembly that has a gear reduction unit that is operatively connected to an interaxle differential unit.

BACKGROUND

An axle assembly having an inter-axle differential is disclosed in PCT International Patent Publication No. WO 2004/009392.

SUMMARY

In at least one embodiment, an axle assembly is provided. The axle assembly may include a housing assembly, an input shaft, a gear reduction unit, a first coupling, and an interaxle differential unit. The housing assembly may receive a differential assembly. The input shaft may be rotatable about a first axis and may be at least partially received in the housing assembly. The gear reduction unit may be disposed in the housing assembly and may be operatively connected to the input shaft. The gear reduction unit may include a planetary gear set. The planetary gear set may have a sun gear, a planet carrier, at least one planet pinion, and a ring gear. The sun gear may be rotatable about the first axis. The planet carrier may rotatably support a planet pinion. The ring gear may be fixedly positioned with respect to the housing assembly. The first coupling may be movable between a first position and a second position. The first coupling may couple the input shaft to the sun gear such that the sun gear and the input shaft are rotatable together about the first axis when in the first position. The first coupling may couple the input shaft to the planet carrier such that the planet carrier and the input shaft are rotatable together about the first axis when in the second position. The interaxle differential unit that is received in a case that may be at least partially received in the planet carrier. The interaxle differential unit may operatively connect the planetary gear set to the differential assembly and to an output shaft.

In at least one embodiment, an axle assembly is provided. The axle assembly may include a housing assembly, an input shaft, a gear reduction unit, and an interaxle differential unit. The housing assembly may receive a differentia assembly. The input shaft may be at least partially received in the housing assembly and may be rotatable about the first axis. The gear reduction unit may be operatively connected to the input shaft. The gear reduction unit may include a planetary gear set. The planetary gear set may include a sun gear, a planetary ring gear, a planet carrier, and at least one planet pinion. The sun gear and the planetary ring gear may be rotatable about the first axis. The planet carrier may rotatably support a planet pinion that may be in meshing engagement with the sun gear and the planetary ring gear. The planetary ring gear may be movable between a first position and a second position. The planetary ring gear may be coupled to the housing assembly such that the planetary ring gear does not rotate about the first axis when in the first position. The planetary ring gear may be coupled to the planet carrier such that the planet carrier and the planetary ring gear are rotatable together about the first axis when in the second position. The interaxle differential unit may be at least partially received in the planet carrier and may operatively connect the planetary gear set to the differential assembly and to an output shaft.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
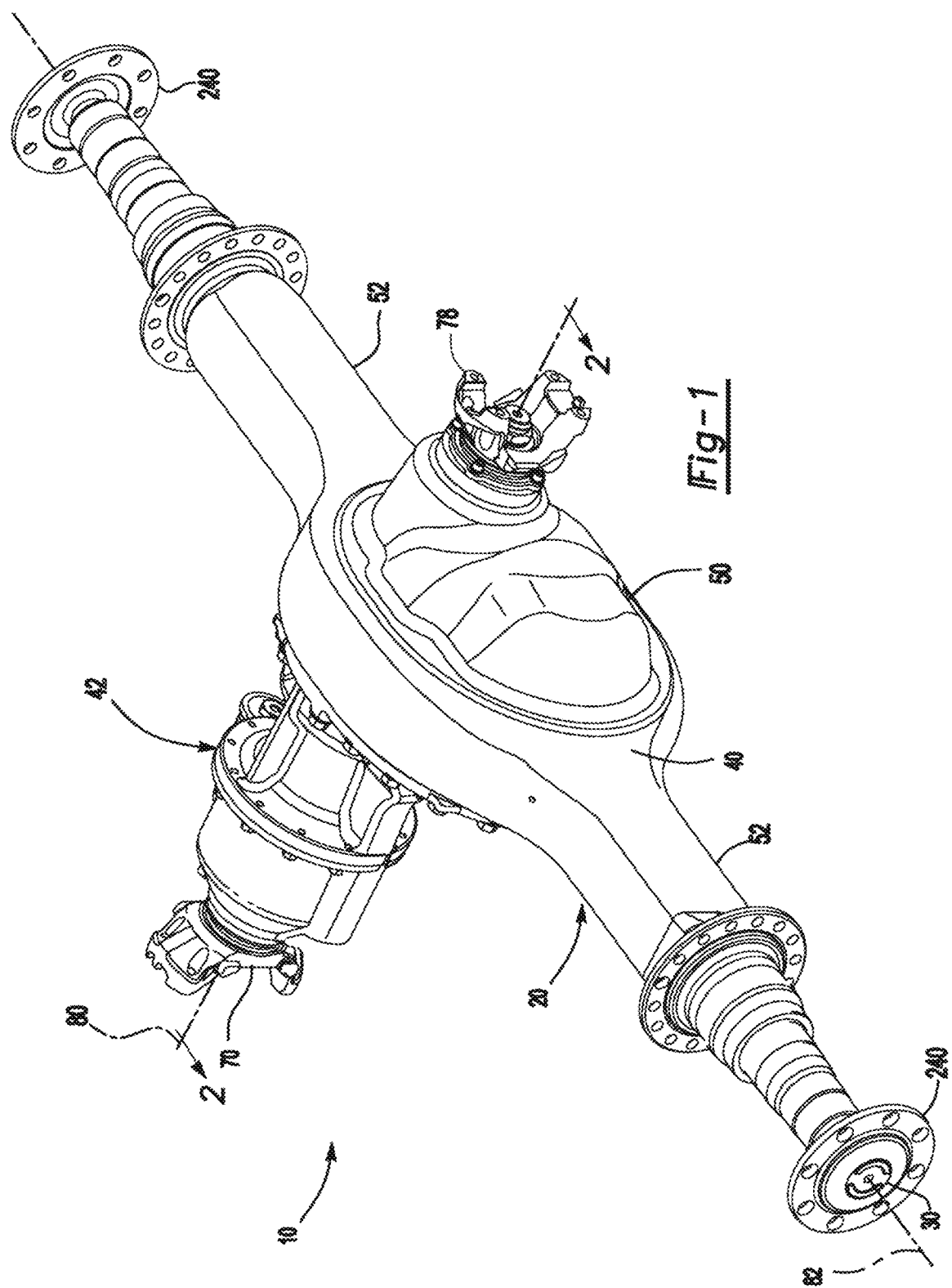
FIG. 1 is a perspective view of an axle assembly having a differential carrier that supports a differential assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies may be provided with the vehicle. For example, the axle assembly 10 may be part of a tandem axle configuration or multi-axle configuration that may include a plurality of axle assemblies that may be connected in series. As is best shown with reference to FIGS. 1 and 2, the axle assembly 10 may include a housing assembly 20, a case 22, a gear reduction unit 24, an interaxle differential unit 26, a differential assembly 28, and at least one axle shaft 30.

Referring to FIG. 1, the housing assembly 20 may receive various components of the axle assembly 10. In addition, the housing assembly 20 may facilitate mounting of the axle assembly 10 to the vehicle. The housing assembly 20 may include an axle housing 40 and a differential carrier 42.

The axle housing 40 may receive and support the axle shafts 30. In at least one embodiment, the axle housing 40 may include a center portion 50 and at least one arm portion 52.

The center portion 50 may be disposed proximate the center of the axle housing 40. The center portion 50 may define a cavity that may receive the differential assembly 28. A lower region of the center portion 50 may at least partially define a sump portion that may contain lubricant. Splashed lubricant may flow down the sides of the center portion 50 and may flow over internal components of the axle assembly 10 and gather in the sump portion.

The center portion 50 may include a carrier mounting surface. The carrier mounting surface may face toward and may engage the differential carrier 42. The carrier mounting surface may facilitate mounting of the differential carrier 42 to the axle housing 40. For example, the carrier mounting surface may have a set of holes that may be aligned with corresponding holes on the differential carrier 42. Each hole may receive a fastener, such as a bolt, that may couple the differential carrier 42 to the axle housing 40.

One or more arm portions 52 may extend from the center portion 50. For example, two arm portions 52 may extend in opposite directions from the center portion 50 and away from the differential assembly 28. The arm portions 52 may have substantially similar configurations. For example, the arm portions 52 may each have a hollow configuration or tubular configuration that may extend around the corresponding axle shaft 30 and may help separate or isolate the axle shaft 30 from the surrounding environment. An arm portion 52 or a portion thereof may be integrally formed with the center portion 50. Alternatively, an arm portion 52 may be separate from the center portion 50. In such a configuration, each arm portion 52 may be attached to the center portion 50 in any suitable manner, such as by welding or with one or more fasteners. Each arm portion 52 may define an arm cavity that may receive a corresponding axle shaft 30.

Figure 2:
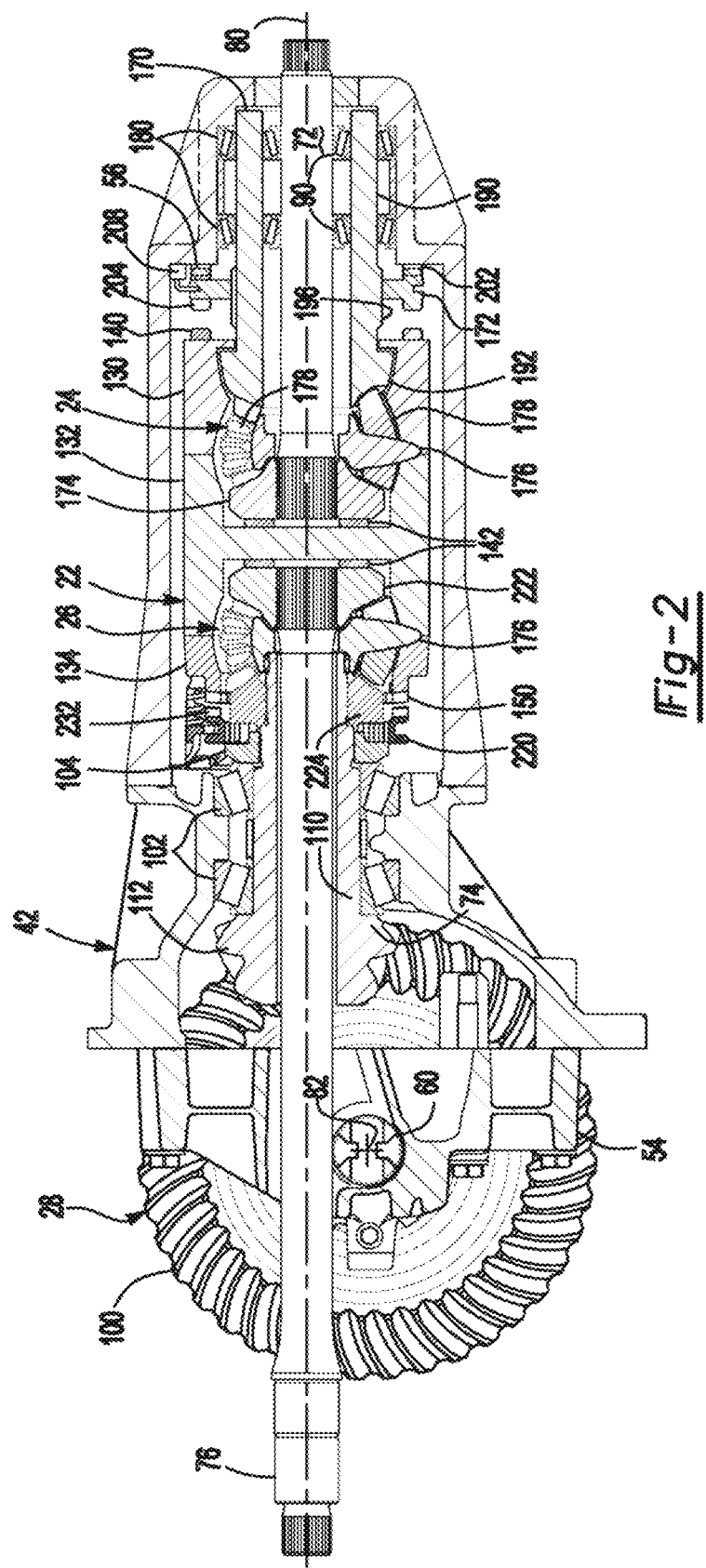
FIG. 2 is a section view along section line 2-2 showing a first embodiment that includes a gear reduction unit, a first coupling in a first position, and an interaxle differential unit in an unlocked condition.

Referring to FIGS. 1 and 2, the differential carrier 42, which may also be called a carrier housing, may be mounted on the center portion 50 of the axle housing 40. The differential carrier 42 may receive the case 22, the gear reduction unit 24, and the interaxle differential unit 26 and may support the differential assembly 28. The differential carrier 42 may be configured as a single component or as multiple components that are assembled to each other. For instance, the differential carrier 42 may include a first portion that is mounted to the axle housing 40 and a second portion that is mounted to the first portion that may receive the interaxle differential unit 26. An end of the differential carrier 42 disposed opposite the axle housing 40 could include or be configured as a removable cover. As is best shown with reference to FIGS. 2 and 3, the differential carrier 42 may have one or more bearing supports 54 and a housing face gear 56.

Referring to FIG. 2, the bearing support 54 may support a roller bearing assembly 60 that may rotatably support the differential assembly 28. For example, two bearing supports 54 may be received in the center portion 50 and may be located proximate opposite sides of the differential assembly 28. The bearing support 54 may be provided in various configurations. For example, a bearing support 54 may include a pair of legs that extend from the differential carrier 42. A bearing cap may be mounted to the legs and may arch over a roller bearing assembly 60. In such a configuration, the bearing support 54 and bearing cap may cooperate to extend around, receive, and secure the roller bearing assembly 60. As another example, the bearing support 54 may be received in a roller bearing assembly 60 which in turn may support the differential assembly 28.

Figure 3:
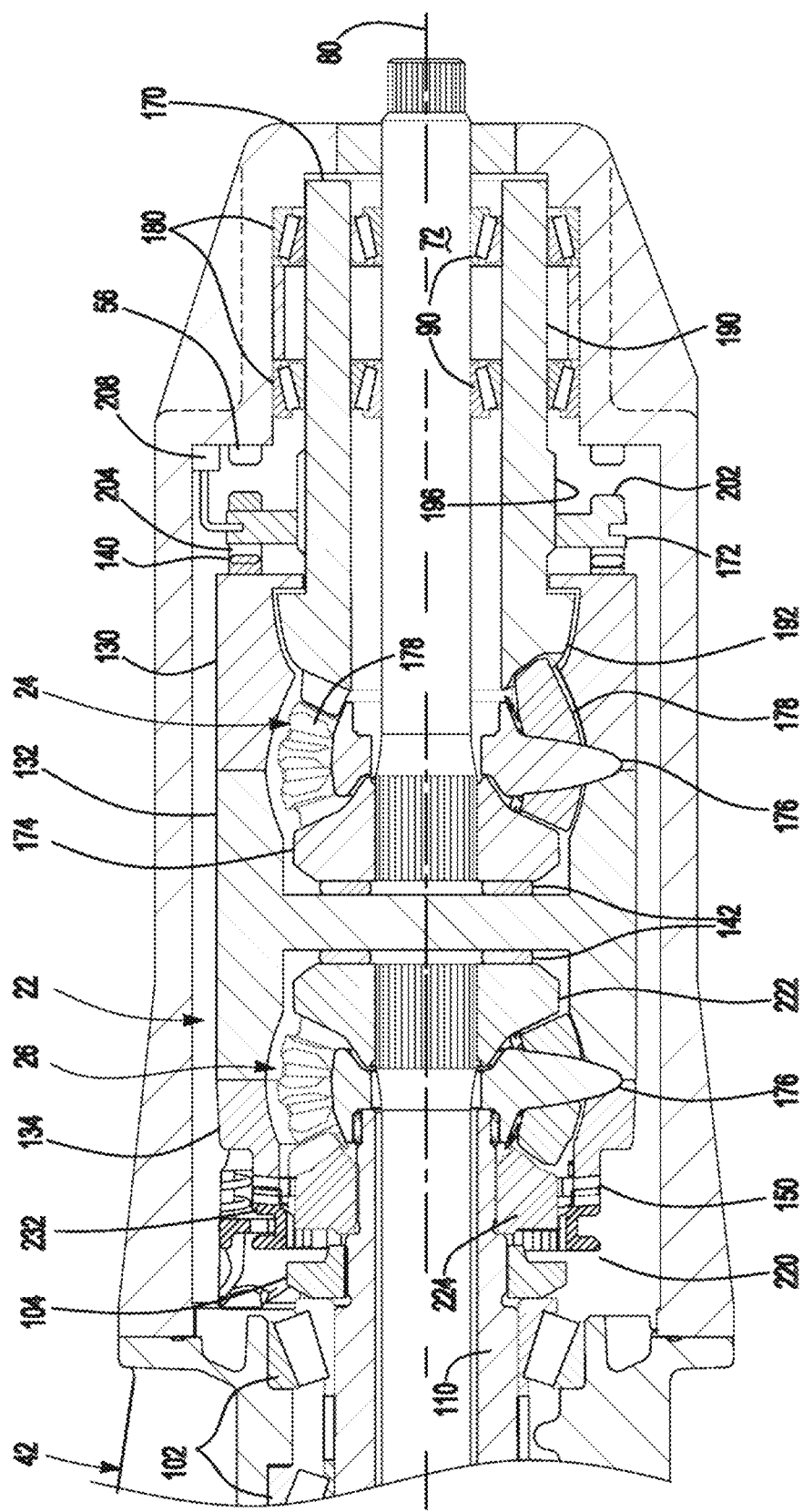
FIG. 3 is a magnified section view of a portion of the differential carrier of FIG. 2 with the first coupling in a second position and the interaxle differential unit in a locked condition.

Referring to FIG. 3, the housing face gear 56 may include a set of teeth that may face toward the case 22. The set of teeth may be selectively engaged by a first coupling as will be discussed in more detail below.

Referring to FIGS. 1-4, additional components that may be associated with transmitting torque to or through the axle assembly 10 may include an input yoke 70, an input shaft 72, a drive pinion 74, an output shaft 76, and an output yoke 78.

Referring to FIG. 1, the input yoke 70 may facilitate coupling of the axle assembly 10 to a torque source. For example, the input yoke 70 may be coupled to the drive shaft. The input yoke 70 may be coupled to the input shaft 72, the input shaft 72 being best shown in FIG. 2. For example, the input yoke 70 may have an opening that receives the input shaft 72 and may be secured to the input shaft 72 with a nut.

Referring to FIGS. 2 and 3, the input shaft 72 may extend along and may be configured to rotate about a first axis 80. For example, the input shaft 72 may be rotatably supported by one or more roller bearing assemblies 90 that may be disposed on the differential carrier 42, the drive pinion 74, or both. The input shaft 72 may be operatively connected to the gear reduction unit 24 as will be discussed in more detail below.

Referring to FIG. 2, the drive pinion 74 may provide torque to a ring gear 100 that may be provided with the differential assembly 28. The drive pinion 74 may extend along and may be configured to rotate about a first axis 80. The ring gear 100 may rotate about a second axis 82. The drive pinion 74 may be coaxially disposed with the output shaft 76 and may be spaced apart from the input shaft 72 and the output shaft 76. The drive pinion 74 may be rotatably supported by one or more roller bearing assemblies 102 that may be disposed on the differential carrier 42, the input shaft 72, or both. A preload nut 104 may be threaded onto the drive pinion 74 and may be rotated to exert a desired preload force on the roller bearing assemblies 102. In at least one embodiment, the drive pinion 74 may include a shaft portion 110 and a gear portion 112.

Figure 4:
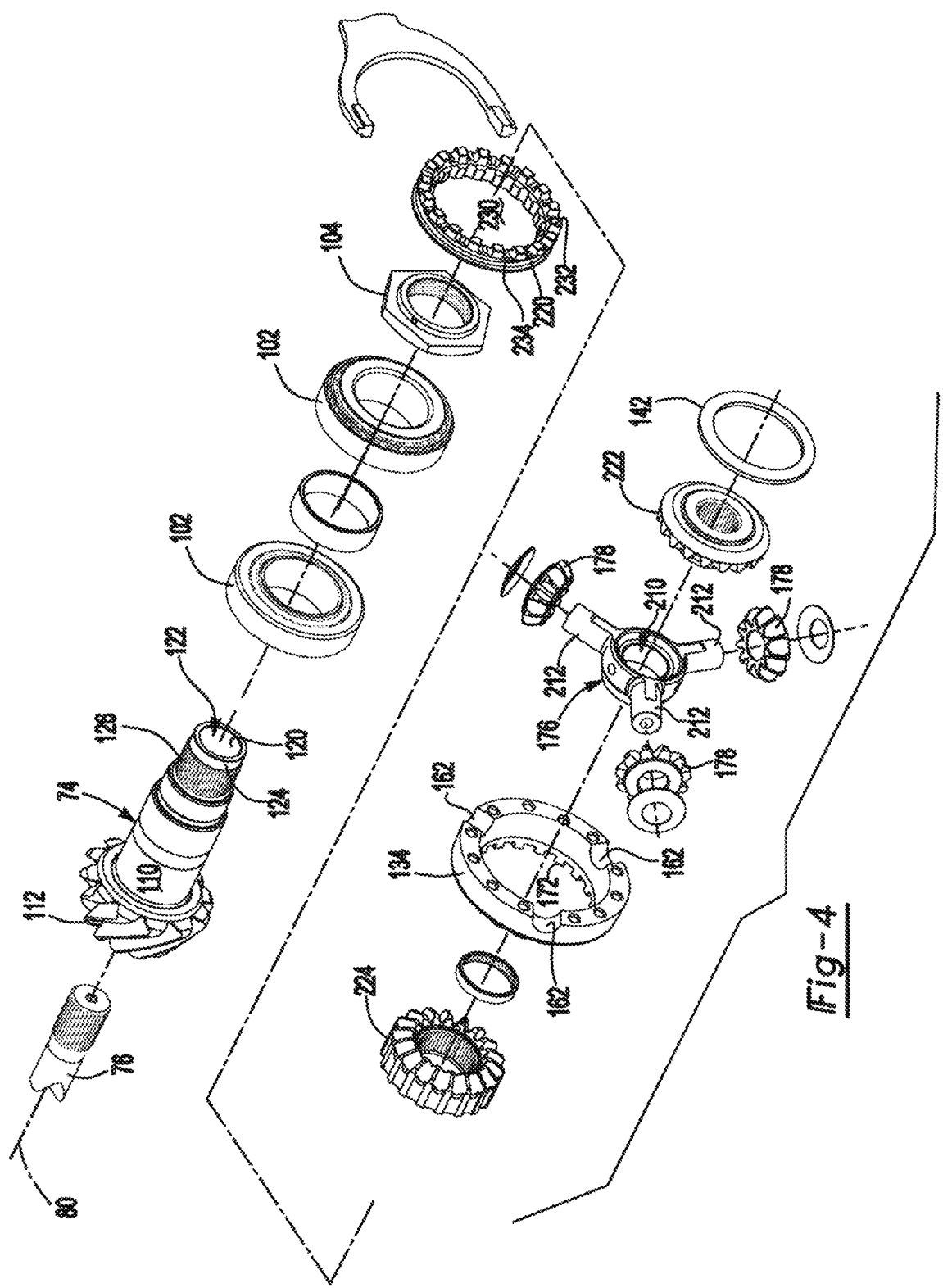
FIGS. 4 and 5 are exploded views of a portion of the differential carrier.

Referring to FIGS. 2 and 4, the shaft portion 110 may extend from the interaxle differential unit 26 to the gear portion 112. As is best shown with reference to FIG. 4, the shaft portion 110 may include an inner drive pinion surface 120, a drive pinion passage 122, a drive pinion outer surface 124, and a drive pinion spline 126.

The inner drive pinion surface 120 may be spaced apart from the first axis 80 and may be radially disposed with respect to the first axis 80. For example, the inner drive pinion surface 120 may be an inside circumference of the drive pinion 74. The inner drive pinion surface 120 may be spaced apart from and may not engage the output shaft 76. The inner drive pinion surface 120 may extend completely through the drive pinion 74 and may define the drive pinion passage 122.

The drive pinion passage 122 may extend along the first axis 80. The output shaft 76 may extend through the drive pinion passage 122.

The drive pinion outer surface 124 may be disposed near an end of the shaft portion 110. In at least one embodiment, the drive pinion outer surface 124 may face away from the first axis 80 and may be an outside circumference of a portion of the shaft portion 110. The drive pinion outer surface 124 may optionally support a stabilizer bearing of the interaxle differential unit 26.

The drive pinion spline 126 may be disposed opposite the drive pinion passage 122. The drive pinion spline 126 may include a plurality of teeth. The teeth may be disposed substantially parallel to the first axis 80 and may mate with a corresponding spline on a second side gear of the interaxle differential unit 26 as will be discussed in more detail below.

The gear portion 112 may be disposed at an end of the shaft portion 110. The gear portion 112 may have a plurality of teeth that may mate with corresponding teeth on the ring gear 100. The gear portion 112 may be integrally formed with the shaft portion 110 or may be provided as a separate component that may be fixedly disposed on the shad portion 110.

Referring to FIG. 2, the output shaft 76 may extend along and may be configured to rotate about the first axis 80. For instance, the output shaft 76 may be supported by one or more roller bearings that may be disposed on the housing assembly 20. The output shaft 76 may extend through the drive pinion 74 and the drive pinion passage 122. In addition, the output shaft 76 may extend through a spider of the interaxle differential unit 26 as will be discussed in more detail below. The output shaft 76 may be coupled to the interaxle differential unit 26 at a first end. For example, the output shaft 76 may be fixedly coupled to a second side gear of the interaxle differential unit 26. The output shaft 76 may be fixedly coupled to the output yoke 78 at a second end that may be disposed opposite the first end.

Referring to FIG. 1, the output yoke 78 may facilitate coupling of the output shaft 76 to a second axle assembly that may be disposed in series with the axle assembly 10. For instance, the output yoke 78 may be coupled to a connecting shaft, such as a prop shaft, which in turn may be operatively connected to the second axle assembly. As such, the output shaft 76 and the output yoke 78 may provide torque to the second axle assembly.

Referring to FIG. 2, the case 22 may be received in the housing assembly 20. For example, the case 22 may be received in the differential carrier 42 and may be rotatable about the first axis 80 with respect to the differential carrier 42. The case 22 may receive components of the gear reduction unit 24 and the interaxle differential unit 26. In addition, the case 22 may have a multipiece construction that may facilitate assembly or positioning of the gear reduction unit 24 and the interaxle differential unit 26 inside the case 22. In the configuration shown, a three-piece case is depicted; however, it is contemplated that the case 22 may have a greater or lesser number of pieces. In a three-piece configuration, the case 22 may include a first case portion 130, a second case portion 132, and a third case portion 134 that may cooperate to define one or more cavities. For example, a single cavity may be provided that may receive components of the gear reduction unit 24 and the interaxle differential unit 26. In at least one other configuration, the case portions may define separate cavities that receive the gear reduction unit 24 and the interaxle differential unit 26. The case portions may be fastened together in any suitable manner, such as with one or more fasteners like bolts.

Figure 5:
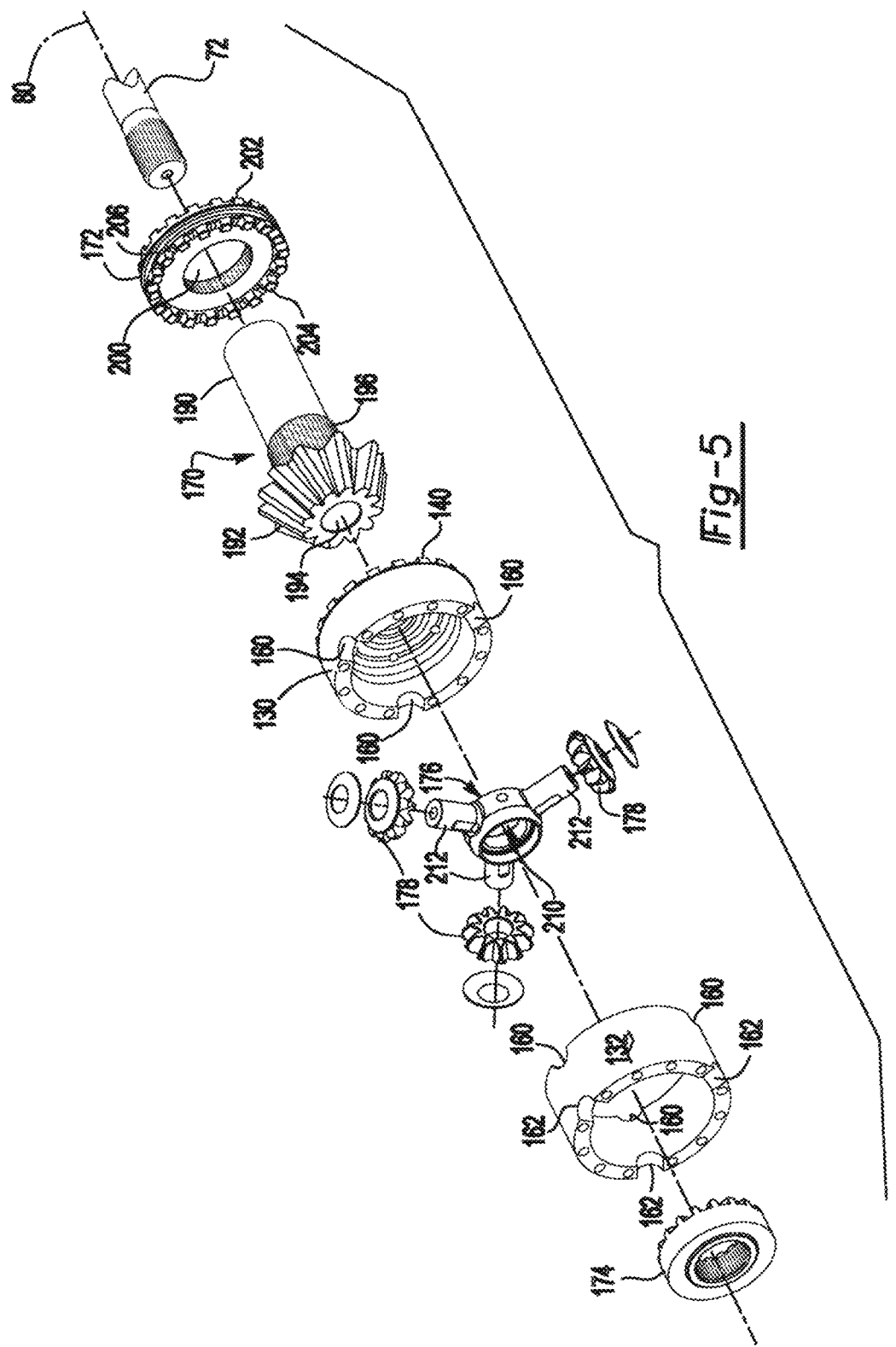

Referring to FIGS. 2 and 5, the first case portion 130 may receive at least a portion of the gear reduction unit 24. The first case portion 130 may include a first case portion face gear 140.

The first case portion face gear 140 may be disposed at an end of the case 22 that may face away from the interaxle differential unit 26. As is best shown in FIG. 2, the first case portion face gear 140 may include a plurality of teeth that may be arranged around the first axis 80. The teeth may extend away from the first case portion 130 toward a first coupling as will be described in more detail below.

The second case portion 132 may be disposed between and may be mounted to the first case portion 130 and the third case portion 134. The second case portion 132 may receive a portion of the gear reduction unit 24, the interaxle differential unit 26, or both. The second case portion 132 may be configured as a ring that may extend around the first axis 80.

Referring to FIGS. 2 and 4, the third case portion 134 may be disposed opposite the first case portion 130. The third case portion 134 may receive at least a portion of the interaxle differential unit 26. The third case portion 134 may include a third case portion face gear 150.

Referring to FIG. 2, the third case portion face gear 150 may be disposed at an end of the case 22 that may face toward the ring gear 100. As is best shown in FIG. 2, the third case portion face gear 150 may include a plurality of teeth that may be arranged around the first axis 80. The teeth may extend away from the third case portion 134 toward a clutch collar as will be described in more detail below.

Referring to FIGS. 4 and 5, the first case portion 130 may cooperate with the second case portion 132 to define one or more spider shaft holes 160. Similarly, the second case portion 132 may cooperate with the third case portion 134 to define one or more spider shaft holes 162. A spider shaft hole 160 may receive a shaft of a spider of the gear reduction unit 24. A spider shaft hole 162 may receive a shaft of a spider of the interaxle differential unit 26. In the configuration shown, three spider shaft holes 160, 162 are shown; however, it is contemplated that a greater or lesser number of spider shaft holes 160, 162 may be provided. The spider shaft holes 160, 162 may be spaced apart from each other and may be arranged around the first axis 80. For example, spider shaft holes 160, 162 may be disposed along axes that may be disposed substantially perpendicular to the first axis 80.

Referring to FIG. 2, the gear reduction unit 24 may operatively connect the input shaft 72 to the case 22. The gear reduction unit 24 may provide different drive gear ratios to the differential assembly 28 and to the output shaft 76 and another axle assembly connected in series with the axle assembly 10. For example, the gear reduction unit 24 may provide a first drive gear ratio and a second drive gear ratio. The first drive gear ratio, which may be referred to as a low range drive gear ratio, may provide gear reduction from the input shaft 72 to the drive pinion 74 (and hence to the axle shafts 30 of the axle assembly 10) and the output shaft 76 (and hence to the axle shafts of a second axle assembly). For instance, the first drive gear ratio may provide a 2:1 gear ratio or more. The first drive gear ratio may provide increased torque to a vehicle traction wheel as compared to the second drive gear ratio. The second drive gear ratio, which may be referred to as a high range drive gear ratio, may provide a different gear reduction ratio or lesser gear reduction ratio than the first drive gear ratio. For instance, the second drive gear ratio may provide a 1:1 gear ratio. The second drive gear ratio may facilitate faster vehicle cruising or a cruising gear ratio that may help improve fuel economy.

As is best shown with reference to FIGS. 2, 3 and 5, the gear reduction unit 24 may include an input gear 170, a first coupling 172, a first side gear 174, a spider 176, and at least one pinion gear 178. The case 22 may at least partially receive the input gear 170, first side gear 174, spider 176, and pinion gear(s) 178.

Referring to FIG. 2, the input gear 170 may extend along and may be configured to rotate about the first axis 80. The input gear 170 may be coaxially disposed with the input shaft 72 and may be spaced apart from the input shaft 72. The input gear 170 may be rotatably supported by one or more roller bearing assemblies 180 that may be disposed on the differential carrier 42. In FIG. 2, two roller bearing assemblies 180 are shown that may be spaced apart from each other and may extend around the input gear 170. In at least one embodiment, the input gear 170 may include a shaft portion 190 and a gear portion 192.

Referring to FIGS. 2 and 5, the shaft portion 190 may be at least partially disposed outside the case 22 and may extend to the gear portion 192. The shaft portion 190 may at least partially define an input pinion passage 194 through which the input shaft 72 may extend. One or more roller bearing assemblies 90 may be disposed in the input pinion passage 194 and may rotatably support the input gear 170 upon the input shaft 72. In addition, the shaft portion 190 may include an input pinion spline 196. The input pinion spline 196 may be axially positioned between the gear portion 192 and an end of the shaft portion 190 that is disposed opposite the gear portion 192. The input pinion spline 196 may include a plurality of teeth. The teeth may be disposed substantially parallel to the first axis 80 and may mate with a corresponding spline on the first coupling 172.

The first coupling 172, which may also be referred to as a first collar, may be moveably disposed on the input gear 170. The first coupling 172 may move axially or move along the first axis 80 between a first position and a second position as will be discussed in more detail below. As is best shown in FIG. 5, the first coupling 172 may be generally ring-shaped and may include a coupling hole 200, a first coupling face gear 202, a second coupling face gear 204, and a coupling groove 206.

The coupling hole 200 may extend through the first coupling 172 and extend around the first axis 80. The coupling hole 200 may receive the input gear 170 as is best shown in FIG. 2. For example, the first coupling 172 may have a spline that may extend into the coupling hole 200 and toward the first axis 80 and may mate with the input pinion spline 196. The mating splines may allow the first coupling 172 to move in an axial direction or along the first axis 80 while inhibiting rotation of the first coupling 172 about the first axis 80 with respect to the input gear 170.

The first coupling face gear 202 may include a set of teeth that may face away from the case 22. The set of teeth may be arranged around the first axis 80 and may selectively engage the teeth of the housing face gear 56 of the differential carrier 42 depending on the position of the first coupling 172.

The second coupling face gear 204 may be disposed opposite the first coupling face gear 202. The second coupling face gear 204 may include a set of teeth that may face toward the case 22. The set of teeth may be arranged around the first axis 80 and may selectively engage the teeth of the first case portion face gear 140 of the case 22 depending on the position of the first coupling 172.

The coupling groove 206 may face away from the first axis 80 and may extend around the first axis 80. The coupling groove 206 may receive a linkage, such as a shift fork, that may operatively connect the first coupling 172 to a first actuator 208. The first actuator 208 may move the first coupling 172 between the first position and the second position. The first actuator 208 may be of any suitable type, such as a mechanical electromechanical, electrical, pneumatic, or hydraulic actuator. In addition, the first actuator 208 may move the first coupling 172 or any variants of the first coupling described below to a neutral position that may be disposed between the first position and the second position.

Referring to FIG. 2, the first coupling face gear 202 may engage the housing face gear 56 and the second coupling face gear 204 may be disengaged from the first case portion face gear 140 when the first coupling 172 is in the first position. As such, the input gear 170 may not rotate about the first axis 80, but the case 22 may rotate about the first axis 80 with respect to the input gear 170. As a result, the input shaft 72 and first side gear 174 may rotate together about the first axis 80 and the pinion gears 178 may rotate with respect to the spider 176 and react against the stationary input gear 170, thereby rotating the case 22.

Referring to FIG. 3, the first coupling face gear 202 may be disengaged from the housing face gear 56 and the second coupling face gear 204 may be engaged with the first case portion face gear 140 when the first coupling 172 is in the second position. As such, the case 22 may not rotate about the first axis 80 with respect to the input gear 170, but the case 22 and the input gear 170 may rotate together about the first axis 80. As a result, the input shaft 72 and first side gear 174 may rotate together about the first axis 80, but the pinion gears 178 may not rotate with respect to the spider 176 since the input gear 170 and spider 176 are both fixedly positioned with respect to the case 22.

Referring to FIGS. 2, 3 and 5, the first side gear 174 may be fixedly disposed on the input shaft 72. For example, the first side gear 174 may have a center bore that may receive the input shaft 72. The center bore may include a spline that may mate with a corresponding spline on the input shaft 72. As such, the first side gear 174 may not rotate about the first axis 80 with respect to the input shaft 72.

The spider 176 may be fixedly positioned with respect to the case 22 and may be rotatably disposed on the input shaft 72. In at least one configuration, the spider 176 may include a spider hole 210 and one or more spider shafts 212.

Referring to FIG. 5, the spider hole 210 may be a through hole that may extend through the spider 176. The input shaft 72 may extend through the spider hole 210.

One or more spider shafts 212 may extend away from the first axis 80 and the spider hole 210. In the configuration shown, three spider shafts 212 are provided; however, it is contemplated that a greater or lesser number of spider shafts 212 may be provided. Each spider shaft 212 may extend along a spider shaft axis that may be disposed substantially perpendicular to the first axis 80. In addition, an end of each spider shaft 212 may be received in a corresponding spider shaft hole 160 of the case 22.

Referring to FIGS. 2, 3 and 5, a pinion gear 178 may be rotatably disposed on a corresponding spider shaft 212. Each pinion gear 178 may have teeth that may mesh with teeth on the first side gear 174 and the gear portion 192 of the input gear 170.

Referring to FIGS. 2-4, the interaxle differential unit 26 may operatively connect the input shaft 72 and the case 22 to the drive pinion 74 and/or the output shaft 76. The interaxle differential unit 26 may compensate for speed differences between different drive axle assemblies, such as speed differences between the axle assembly 10 and a second axle assembly that is connected in series with the axle assembly 10. The interaxle differential unit 26 may include a clutch collar 220, a second side gear 222, a third side gear 224, as well as a spider 176 and one or more pinion gears 178. The case 22 may at least partially receive the second side gear 222, third side gear 224, spider 176, and pinion gear(s) 178.

The clutch collar 220, which may also be referred to as a second coupling, may be moveably disposed on the drive pinion 74. In addition, the clutch collar 220 may move independently of the first coupling 172. The clutch collar 220 may move axially or move along the first axis 80 between a retracted position and an extended position as will be discussed in more detail below. As is best shown in FIG. 4, the clutch collar 220 may be generally ring-shaped and may include a clutch collar hole 230, a clutch collar face gear 232, and a clutch collar groove 234.

The clutch collar hole 230 may extend through the clutch collar 220 and extend around the first axis 80. The clutch collar hole 230 may receive the drive pinion 74 and the third side gear 224. For example, the clutch collar hole 230 may have a spline that may extend into the clutch collar hole 230 and toward the first axis 80 and may mate with a spline or gear teeth that may be arranged around the circumference of the third side gear 224. The mating splines may allow the clutch collar 220 to move in an axial direction or along the first axis 80 while inhibiting rotation of the clutch collar 220 about the first axis 80 with respect to the drive pinion 74 and the third side gear 224.

The clutch collar face gear 232 may include a set of teeth that may face toward the interaxle differential unit 26. The set of teeth may be arranged around the first axis 80 and may selectively engage the teeth of the third case portion face gear 150 depending on the position of the clutch collar 220.

The clutch collar groove 234 may face away from the first axis 80 and may extend around the first axis 80. The clutch collar groove 234 may receive a linkage, such as a shift fork, that may operatively connect the clutch collar 220 to a second actuator. The second actuator may move the clutch collar 220 between the unlocked position and the locked position. The second actuator may be of any suitable type, such as a mechanical, electromechanical, electrical, pneumatic, or hydraulic actuator.

Referring to FIG. 2, the clutch collar face gear 232 may not engage the case 22 and the third case portion face gear 150 when the clutch collar 220 is in the unlocked position. As such, the third side gear 224 and drive pinion 74 may be permitted to rotate with respect to the case 22. This in turn may allow the case 22 and the output shaft 76 to rotate at different velocities with respect to each other. In addition, the input shaft 72 and the output shaft 76 may be permitted to rotate at different velocities with respect to each other when the clutch collar 220 is in the unlocked position.

Referring to FIG. 3, the clutch collar face gear 232 may engage the third side gear 224 when the clutch collar 220 is in the locked position, thereby inhibiting the third side gear 224 and the drive pinion 74 from rotating with respect to the case 22. This in turn may prevent the case 22 and the output shaft 76 from rotating at different velocities with respect to each other. In addition, the input shaft 72 and the output shaft 76 may be inhibited or prevented from rotating at different velocities with respect to each other when the clutch collar 220 is in the locked position.

Referring to FIGS. 2 and 4, second side gear 222 may be fixedly coupled to the output shaft 76. For example, the second side gear 222 may have a center bore that may receive the output shaft 76. The center bore may include a spline that may mate with a corresponding spline on the output shaft 76. As such, the second side gear 222 may not rotate about the first axis 80 with respect to the output shaft 76.

The third side gear 224 may be fixedly disposed on the drive pinion 74. For example, the third side gear 224 may have a center bore that may receive the shaft portion 110 of the drive pinion 74. The center bore may include a spline that may mate with the drive pinion spline 126. As such, the third side gear 224 may not rotate about the first axis 80 with respect to the drive pinion 74.

The spider 176 of the interaxle differential unit 26 may be fixedly positioned with respect to the case 22 and may be rotatably disposed on the output shaft 76. The spider 176 may be spaced apart from the drive pinion 74. As is best shown in FIG. 4, the spider 176 may include a spider hole 210 and one or more spider shafts 212. The output shaft 76 may extend through the spider hole 210. The spider shaft 212 of the spider 176 of the interaxle differential unit 26 may be received in corresponding spider shaft holes 162 of the case 22. A pinion gear 178 may be rotatably disposed on a corresponding spider shaft 212 of the spider 176. Each pinion gear 178 may have teeth that may mesh with teeth on the second side gear 222 and the third side gear 224.

Referring to FIGS. 2 and 4, one or more thrust bearings 142 may be disposed between the first side gear 174 and the second side gear 222. The thrust bearing 142 may separate the first side gear 174 from the second side gear 222 and help axially position the input shaft 72 with respect to the output shaft 76. For example, a thrust bearing 142 may extend from the first side gear 174 to the second side gear 222 or the case 22 may include a divider wall 236 that may be disposed between the first side gear 174 to the second side gear 222, in which case a thrust bearing 142 may extend from the first side gear 174 to the divider wall 236, a thrust bearing 142 may extend from the second side gear 222 to the divider wall 236, or both.

Referring to FIG. 2, the differential assembly 28 may be disposed in the center portion 50 of the housing assembly 20. The differential assembly 28 may transmit torque to the vehicle traction wheel assemblies and permit the traction wheel assemblies to rotate at different velocities. An abbreviated discussion of the operation of the differential assembly 28 follows with reference to FIGS. 1 and 2, beginning with the input yoke 70 shown in FIG. 1.

The input yoke 70 may be coupled to a vehicle drivetrain component, such as a drive shaft, that may be coupled to an output of a vehicle transmission or transfer case, which in turn may receive torque from a vehicle power source, such as an engine or motor. Alternatively, the input yoke 70 may be operatively connected lo an output of another axle assembly. The input yoke 70 may be operatively connected to the input shaft 72, which in turn may be operatively connected to the drive pinion 74. The drive pinion 74 may provide torque to the ring gear 100 of the differential assembly 28. The differential assembly 28 may be operatively connected to the axle shafts 30 and may permit the axle shafts 30 to rotate at different rotational speeds in a manner known by those skilled in the art. As such, the differential assembly 28 may receive torque via the ring gear 100 and provide torque to the axle shafts 30.

Referring to FIGS. 1 and 2, the axle shafts 30 may transmit torque from the differential assembly 28 to corresponding traction wheel assemblies. For example, two axle shafts 30 may be provided such that each axle shaft 30 extends through a different arm portion 52 of axle housing 40. The axle shafts 30 may extend along and may be rotated about the second axis 82 by the differential assembly 28. Each axle shaft 30 may have a first end and a second end. The first end may be operatively connected to the differential assembly 28. The second end may be disposed opposite the first end and may be operatively connected to a wheel end assembly that may have a wheel hub that may support a wheel. As shown in FIG. 1, an axle flange 240 may be disposed proximate the second end of the axle shaft 30 and may facilitate coupling of the axle shaft 30 to the wheel hub.

Figure 6:
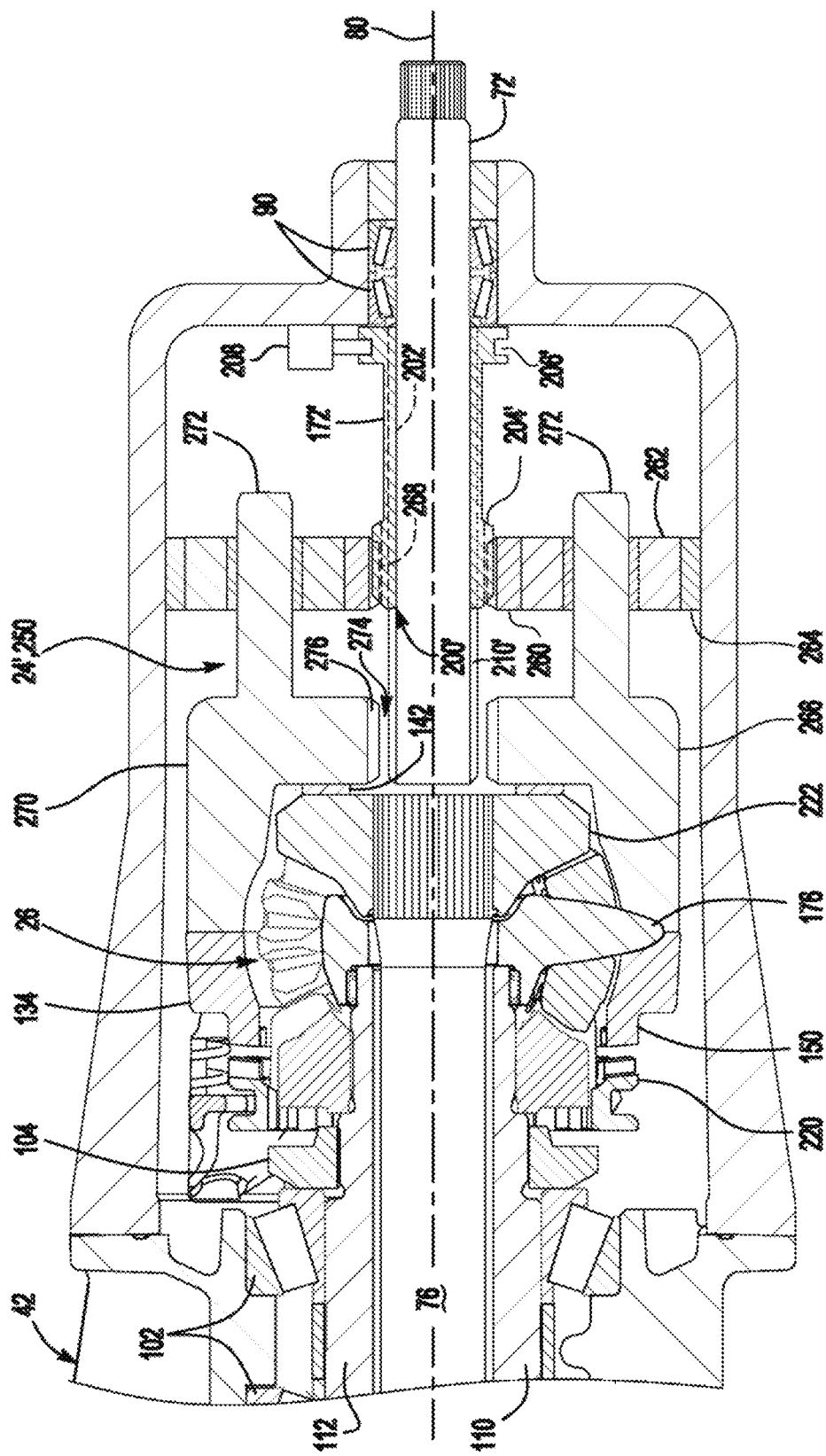
FIGS. 6 and 7 are section views of a second embodiment that includes a gear reduction unit having a planetary gear set and illustrates a first coupling in first and second positions, respectively.
Figure 7:
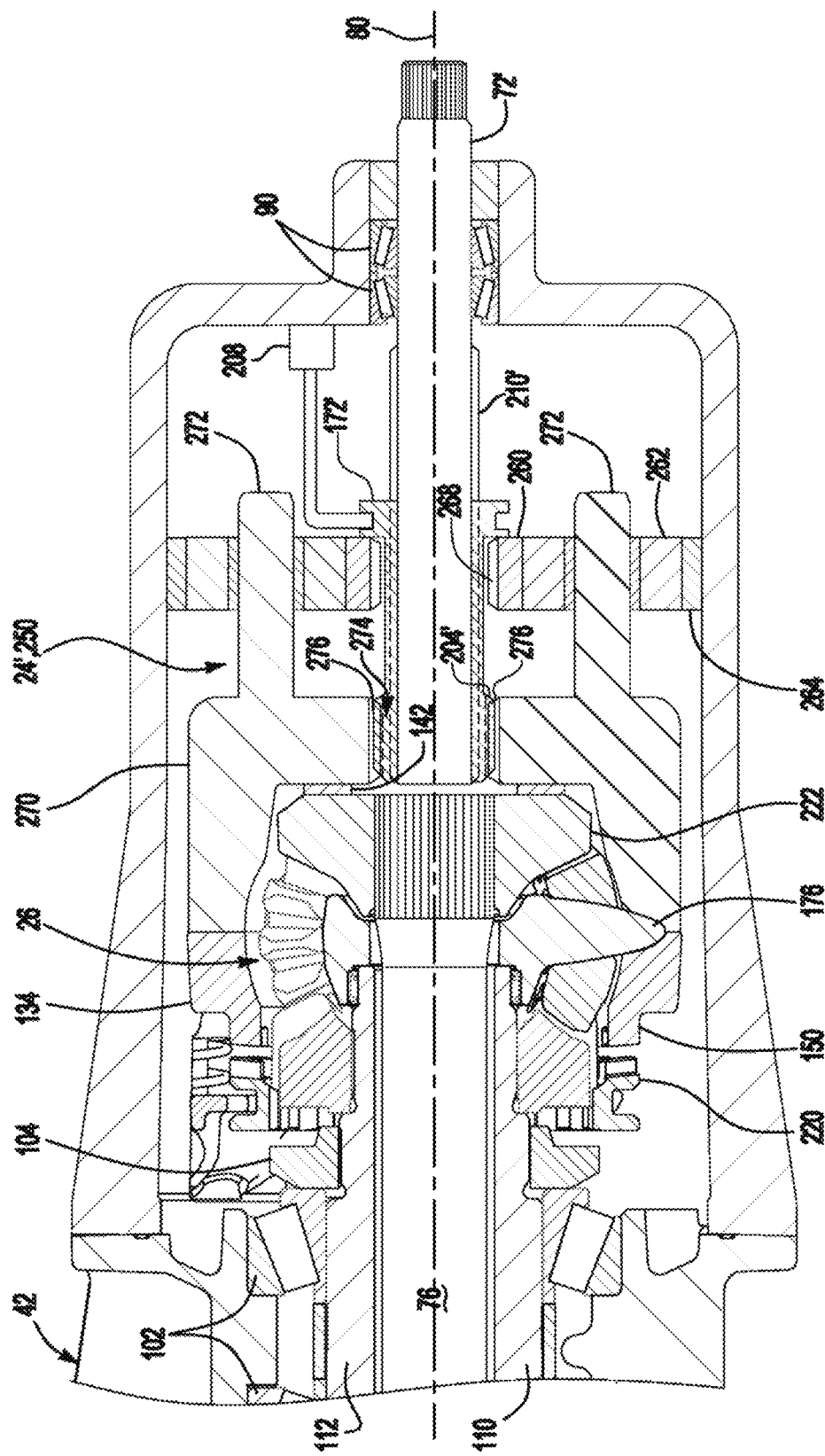

Referring to FIGS. 6 and 7, a second embodiment is shown in which the gear reduction unit 24' may include or may be configured as a planetary gear set 250. The planetary gear set 250 may be configured to provide a desired gear reduction ratio and increase torque provided from the input shaft 72' to the drive pinion 74 and the output shaft 76, and hence to the axle shafts 30 of the axle assembly 10 and the second axle assembly. The gear reduction unit 24' may provide a first drive gear ratio (low range drive gear ratio) and a second drive gear ratio (high range drive gear ratio) as previously described. For instance, the first drive gear ratio may provide a 3:1 gear reduction ratio or more while the second drive gear ratio may provide a 1:1 gear ratio.

The planetary gear set 250 may be disposed in the housing assembly 20. For instance, the planetary gear set 250 may be receded in the differential carrier 42 and may be axially positioned between an end of the differential carrier 42 through which the input shaft 72' enters the differential carrier 42 and the interaxle differential unit 26. In at least one embodiment, the planetary gear set 250 may include a sun gear 260, a plurality of planet pinions 262, a planetary ring gear 264, and a planet carrier 266.

The sun gear 260 may be disposed proximate the center of the planetary gear set 250 and may be rotatable about the first axis 80. The sun gear 260 have a hole that may receive the input shaft 72' and the first coupling 172'. For instance, the first coupling 172' may be received in the hole of the sun gear 260 such that the first coupling 172' may be disposed between and may separate the input shaft 72' from the sun gear 260. The sun gear 260 may have a sun gear spline 268 that may be disposed in the hole and that may mate with a corresponding spline on the first coupling 172'. The mating splines may be configured to permit the first coupling 172' to move axially or along the first axis 80 with respect to the sun gear 260. The sun gear 260 may also have a second set of teeth that may be disposed opposite the hole and that may meshingly engage or be in meshing engagement with the planet pinions 262.

The planet pinions 262 may be spaced apart from each other and may be rotatably disposed between the sun gear 260 and the planetary ring gear 264. Each planet pinion 262 may have a planet pinion hole and a set of teeth. The planet pinion hole may be a through hole that may extend through the planet pinion 262. The set of teeth may be disposed opposite the planet pinion hole. The set of teeth may mesh with teeth on the sun gear 260 and teeth on the planetary ring gear 264. Each planet pinion 262 may be configured to rotate about a different planet pinion axis. The planet pinion axes may extend substantially parallel to the first axis 80.

The planetary ring gear 264 may extend around the first axis 80 and may receive the planet pinions 262. The planetary ring gear 264 may include a plurality of teeth that may extend toward the first axis 80 and may mesh with teeth on the planet pinions 262. The planetary ring gear 264 may be fixedly positioned with respect to the housing assembly 20 and the first axis 80. For example, the planetary ring gear 264 may be fixedly disposed in the housing assembly 20 such that an outside circumference of the planetary ring gear 264 may be disposed on the differential carrier 42.

The planet carrier 266 may be coupled to the planet pinions 262 and may be rotatable about the first axis 80. The planet carrier 266 may include a case portion 270 and one or more pins 272.

The case portion 270 may be part of the case 22. As such, the case portion 270 may receive components of the interaxle differential unit 26. For example, the case portion 270 may receive the spider 176, pinion gears 178, second side gear 222, or combinations thereof. The case portion 270 may be fixedly mounted on another portion of the case 22, such as the third case portion 134. The case portion 270 and the third case portion 134 may cooperate to define one or more spider shaft holes 162 that may receive spider shafts 212 of the spider 176 of the interaxle differential unit 26. An optional thrust bearing 142 may be disposed between the second side gear 222 and the case portion 270 to axially position the output shaft 76 with respect to the planet carrier 266. In the section views throughout the application, some spider shafts 212 are not visible and the lower spider shaft that is visible appears to have an elongated parabolic or curved configuration due to the rotational position of the spider 176 with respect to the section plane. Although the spider 176 is illustrated with three spider shafts 212, it is to be understood that a greater or lesser number of spider shafts 212 may be provided.

The case portion 270 may also include a case portion hole 274. The case portion hole 274 may extend around the first axis 80 and may be configured as a through hole that may extend through the case portion 270. A case portion spline 276 may be disposed in the case portion hole 274 and may have teeth that may extend toward the first axis 80. The case portion spline 276 may be spaced apart from the input shaft 72' and may be configured to selectively mate with a second coupling spline of the first coupling 172' as will be discussed in more detail below.

One or more pins 272 may extend from the case portion 270 in a direction that may extend away from the interaxle differential unit 26. Each pin 272 may rotatably support a corresponding planet pinion 262.

The first coupling 172' may be movably disposed on the input shaft 72'. The first coupling 172' may move axially or in a direction that extends along the first axis 80 between a first position and a second position. The first coupling 172' may include a coupling hole 200', a first coupling spline 202', a second coupling spline 204', and a coupling groove 206'.

The coupling hole 200' may extend through the first coupling 172' and may extend around the first axis 80. The coupling hole 200' may receive the input shad 72'.

The first coupling spline 202' may extend into the coupling hole 200' and toward the first axis 80. The first coupling spline 202' may mate with an input shaft spline 210' that may be disposed on the exterior of the input shaft 72'. The mating splines may allow the first coupling 172' to move in an axial direction while inhibiting rotation of the first coupling 172' about the first axis 80 with respect to the input shaft 72'.

The second coupling spline 204' may be disposed opposite the first coupling spline 202'. As such, the second coupling spline 204' may extend away from the first axis 80. The second coupling spline 204' may have an axial length that may be less than an axial length of the first coupling spline 202' so that the second coupling spline 204' cannot simultaneously mesh with the sun gear spline 268 and the case portion spline 276.

The coupling groove 206' may face away from the first axis 80 and may extend around the first axis 80. The coupling groove 206' may receive a linkage, such as a shift fork, that may operatively connect the first coupling 172' to the first actuator 208. The first actuator 208 may move the first coupling 172' between the first position and the second position.

Referring to FIG. 6, the second coupling spline 204' of the first coupling 172' may mate with the sun gear spline 268 when the first coupling 172 is in the first position. As such, the sun gear 260 may rotate with the input shaft 72' about the first axis 80 while the planet pinions 262 and the planet carrier 266 (and hence the case 22) may rotate with respect to the sun gear 260. Accordingly, torque may be transmitted from the input shaft 72' to the sun gear 260 and then to the planet carrier 266 via the planet pinions 262, thereby allowing the planetary gear set 250 to provide gear reduction associated with the first drive gear ratio.

Referring to FIG. 7, the second coupling spline 204' may mate with the case portion spline 276 when the first coupling 172' is disposed in the second position. As such, the planet carrier 266 may rotate with the input shaft 72' about the first axis 80 and torque may be transmitted from the input shaft 72' directly to the planet carrier 266 rather than via the sun gear 260 and the planet pinions 262.

Figure 8:
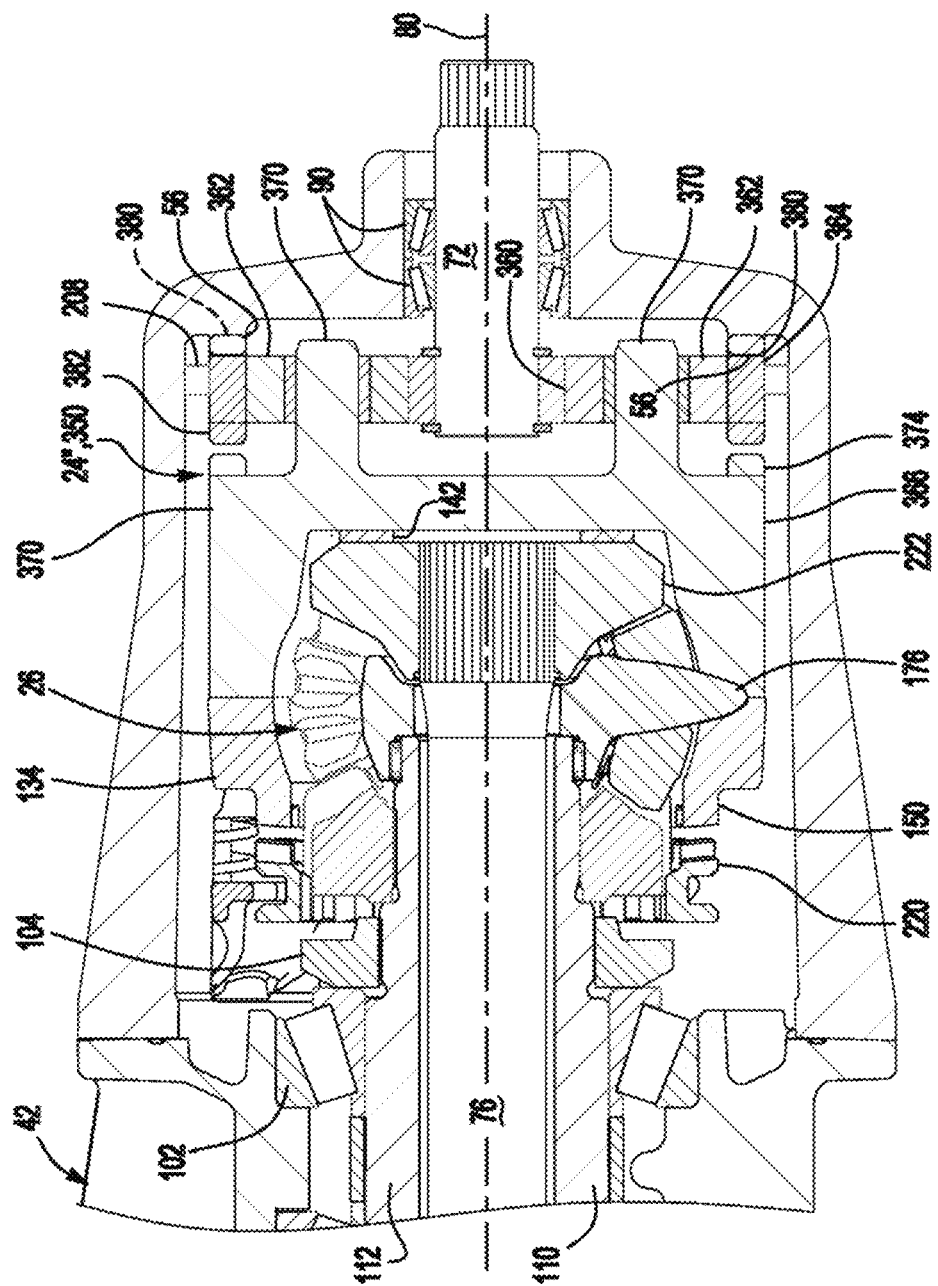
FIGS. 8 and 9 are section views of a third embodiment that includes a gear reduction unit having a planetary gear set and illustrates a planetary ring gear in first and second positions, respectively.
Figure 9:
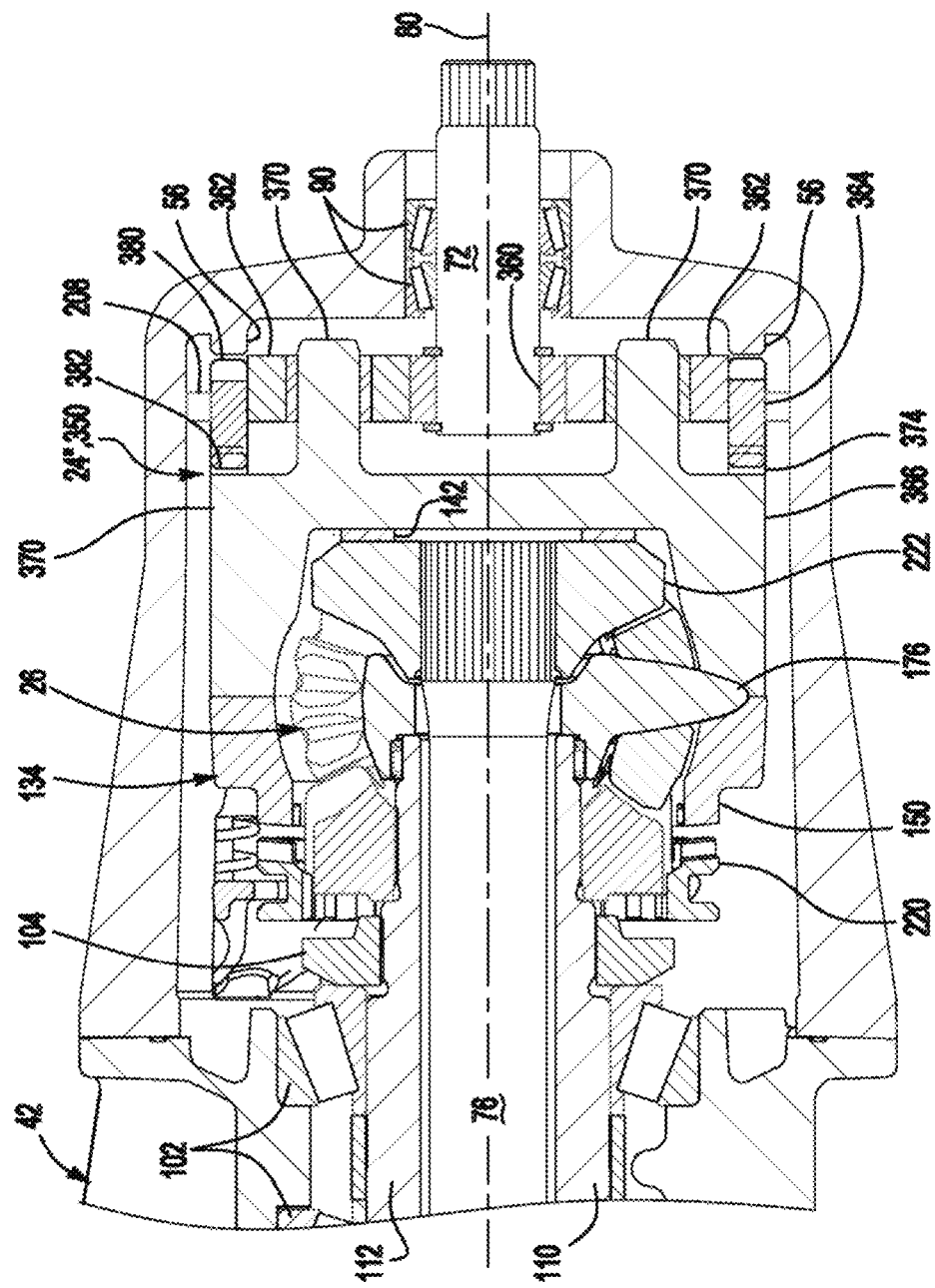

Referring to FIGS. 8 and 9, a third embodiment is shown in which the gear reduction unit 24" may include or may be configured as a planetary gear set 350 that may provide a desired gear reduction ratio. In this configuration, the planetary gear set 350 may include a sun gear 360, a plurality of planet pinions 362, a planetary ring gear 364, and a planet carrier 366.

The sun gear 360 may be disposed proximate the center of the planetary gear set 350 and may be rotatable about the first axis 80. More specifically, the sun gear 360 may be fixedly positioned with respect to the input shaft 72 such that the sun gear 360 may not rotate about the first axis 80 with respect to the input shaft 72. The sun gear 360 may be secured to the input shaft 72 in any suitable manner, such as with mating splines, snap rings or other fasteners, welding or combinations thereof. The sun gear 360 may have teeth that may extend away from the first axis 80 that may meshingly engage the planet pinions 362.

The planet pinions 362 may be spaced apart from each other and may be rotatably disposed between the sun gear 360 and the planetary ring gear 364. The planet pinions 362 may have the same configuration or a similar configuration as the planet pinions 262.

The planetary ring gear 364 may extend around the first axis 80 and may receive the planet pinions 362. The planetary ring gear 364 may include a plurality of teeth that may extend toward the first axis 80 and may mesh with teeth on the planet pinions 362. The planetary ring gear 264 may be movable with respect to the housing assembly 20 and the first axis 80. For example, the planetary ring gear 264 may be actuated by the first actuator 208 and may move axially or in a direction that extends along the first axis 80 between a first position and a second position as will be discussed in more detail below. The planetary ring gear 364 may also include a first planetary ring gear face gear 380 and a second planetary ring gear face gear 382.

The first planetary ring gear face gear 380 may include a set of teeth that may face away from the case 22. The set of teeth may be arranged around the first axis 80 and may selectively engage the teeth of the housing face gear 56 of the differential carrier 42 depending on the position of the planetary ring gear 364.

The second planetary ring gear face gear 382 may be disposed opposite the first planetary ring gear face gear 380. The second planetary ring gear face gear 382 may include a set of teeth that may face toward the case 22. The set of teeth may be arranged around the first axis 80 and may selectively engage the teeth of a planet carrier face gear 374 depending on the position of the planetary ring gear 364 as will be described in more detail below.

The planet carrier 366 may be coupled to the planet pinions 362 and may be rotatable about the first axis 80. The planet carrier 366 may include a case portion 370 one or more pins 372, and a planet carrier face gear 374.

The case portion 370 may be part of the case 22. As such, the case portion 370 may receive components of the interaxle differential unit 26. The case portion 370 may be fixedly mounted on another portion of the case 22, such as the third case portion 134. The case portion 370 and the third case portion 134 may cooperate to define one or more spider shaft holes 162 that may receive spider shafts 212 of the spider 176 of the interaxle differential unit 26. An optional thrust bearing 142 may be disposed between the second side gear 222 and the case portion 370 to axially position the output shaft 76 with respect to the planet carrier 366.

One or more pins 372 may extend from the case portion 370 in a direction that may extend away from the interaxle differential unit 26. Each pin 372 may rotatably support a corresponding planet pinion 362, similar to the pins 272 previously discussed.

The planet carrier face gear 374 may be disposed on a side of the case portion 370 that may face away from the interaxle differential unit 26. The planet carrier face gear 374 may be the same as or similar to the first case portion face gear 140. As such, the planet carrier face gear 374 may include a plurality of teeth that may be arranged around the first axis 80. The teeth may extend toward the planetary ring gear 364.

Referring to FIG. 8, the first planetary ring gear face gear 380 of the planetary ring gear 364 may mate with the housing face gear 56 and may be disengaged from the planet carrier face gear 374 when the planetary ring gear 364 is in the first position. As such, the sun gear 360 may rotate with the input shaft 72 about the first axis 80 while the planet pinions 362 and the planet carrier 366 (and hence the case 22) may rotate with respect to the sun gear 360. Accordingly, torque may be transmitted from the input shaft 72 to the sun gear 360 and then to the planet carrier 366 via the planet pinions 362, thereby allowing the planetary gear set 350 to provide gear reduction associated with the first drive gear ratio.

Referring to FIG. 9, the second planetary ring gear face gear 382 may mate with the planet carrier face gear 374 and may be disengaged from the housing face gear 56 when the planetary ring gear 364 is in the second position. As such, the planetary ring gear 364 may not rotate with respect to the planet carrier 366, which in turn may inhibit rotation of the planet pinions 362 and the sun gear 360, an input shaft 72 with respect to the case 22.

Figure 10:
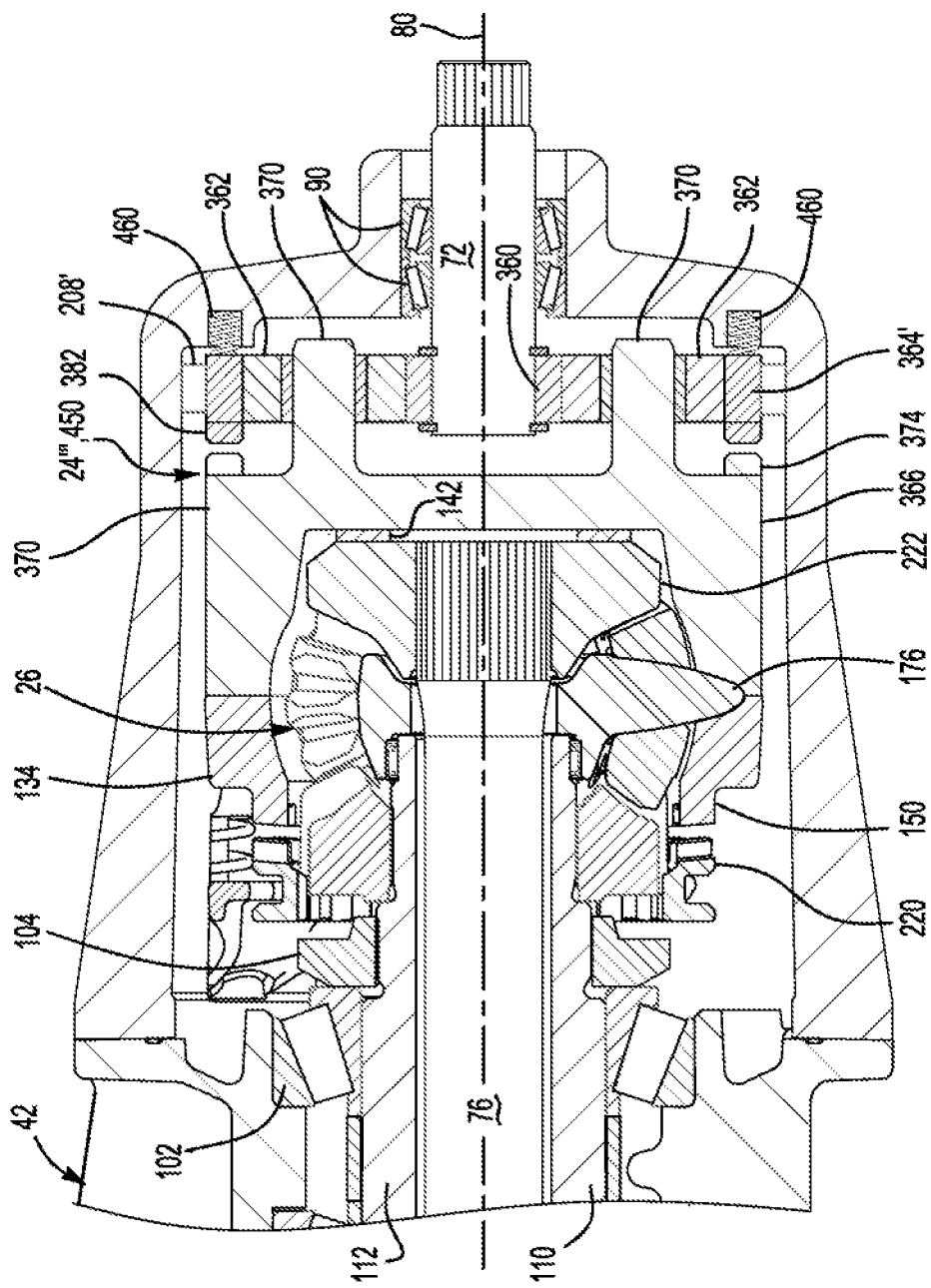
FIGS. 10 and 11 are section views of a fourth embodiment that includes a gear reduction unit having a planetary gear set and illustrates a planetary ring gear in first and second positions, respectively.
Figure 11:
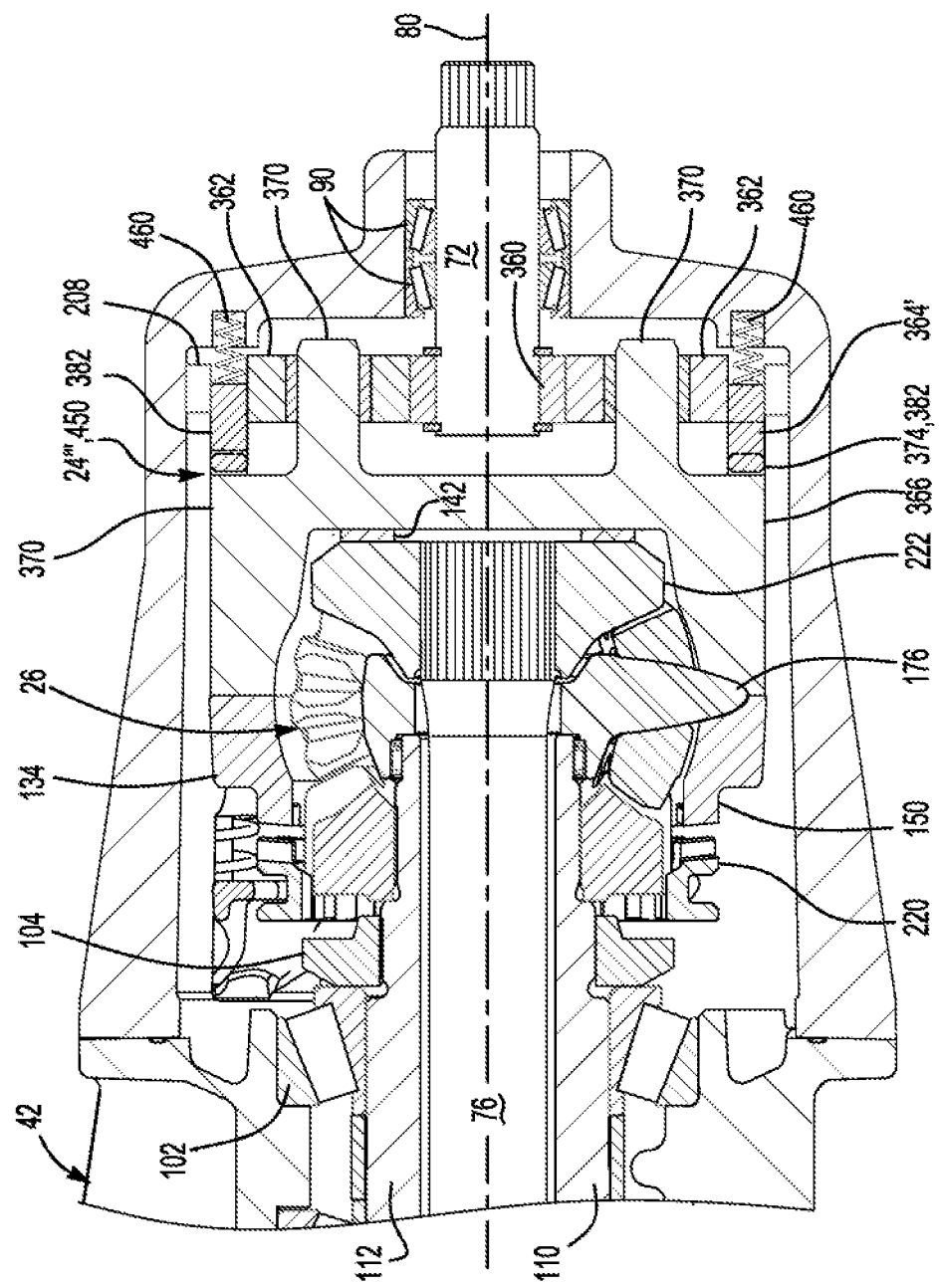

Referring to FIGS. 10 and 11, a fourth embodiment is shown in which the gear reduction unit 24''' may include or may be configured as a planetary gear set 450. This embodiment is similar to the embodiment shown in FIGS. 8 and 9 in that planetary gear set 450 may include may include a sun gear 360, a plurality of planet pinions 362, a planetary ring gear 364', and a planet carrier 366 and the planetary ring gear 364' may move along the first axis 80. However, the planetary ring gear 364' may omit the first planetary ring gear face gear, a first actuator 208' may actuate the planetary ring gear 364' to the first position, and one or more biasing members 460 may actuate the planetary ring gear 364' to the second position.

The first actuator 208' may be configured as a clutch pack, an electromagnetic clutch, or hydraulically actuated clutch. Activation or actuation of the first actuator 208' may move the planetary ring gear 364' to the first position as is best shown in FIG. 10, thereby disengaging the planetary ring gear 364' from the planet carrier 366 and coupling the planetary ring gear 364' to the housing assembly 20.

One or more biasing members 460 may bias the planetary ring gear 364' toward the second position. The biasing member 460 may be of any suitable type. For example, the biasing member 460 may be configured as a wave washer, spring, or the like. As is best shown in FIG. 11, the biasing member 460 may be disposed between the housing assembly 20 and the planetary ring gear 364' and may urge or actuate the planetary ring gear 364' to the second position when sufficient force is not exerted by the first actuator 208'.

Figure 12:
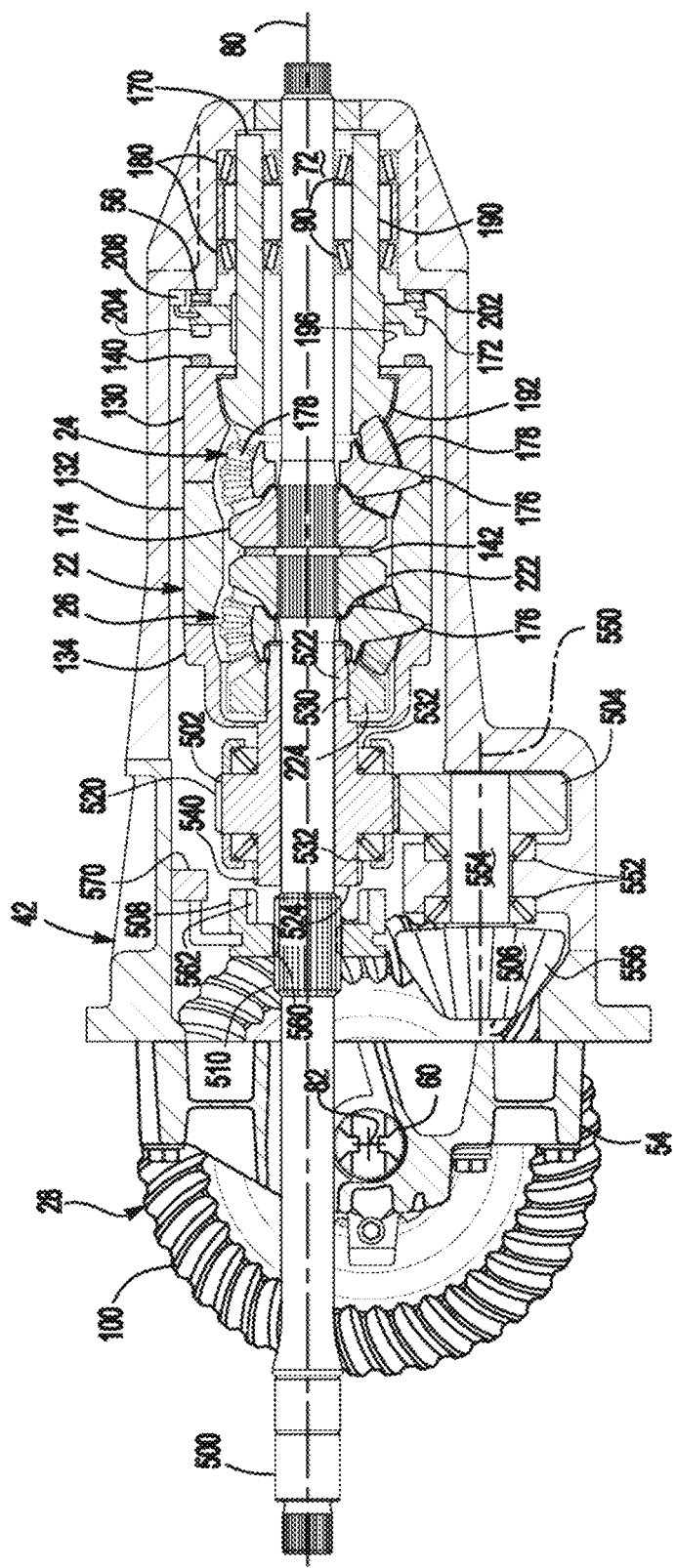
FIG. 12 is a section view of another axle assembly configuration that includes a gear reduction unit, a first coupling in a first position, and an interaxle differential unit in an unlocked condition.
Figure 13:
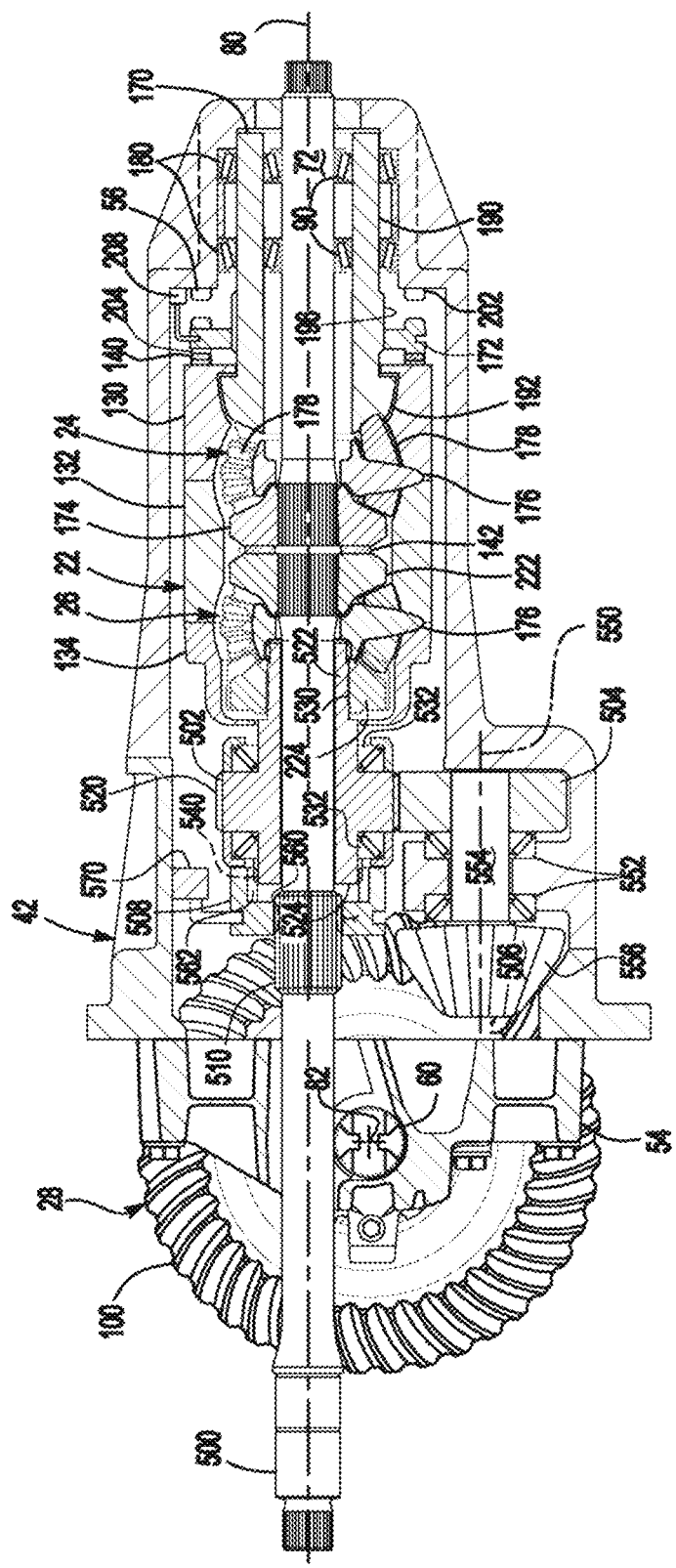
FIG. 13 is a section view of the axle assembly of FIG. 12 with the first coupling in a second position and the interaxle differential unit in a locked condition.

Referring to FIGS. 12 and 13, another configuration of an axle assembly is shown. This configuration may include a housing assembly 20, a case 22, a gear reduction unit 24, an interaxle differential unit 26, a differential assembly 28, and at least one axle shaft 30, an input yoke 70, an input shaft 72, and an output yoke 78 as previously discussed. In addition, the axle assembly may include an output shaft 500, a drive gear 502, a driven gear 504, a drive pinion 506, and a clutch collar 508.

The output shaft 500 may be similar to the output shaft 76 previously described. As such, the output shaft 500 may extend along and may be configured to rotate about the first axis 80, may be rotatably supported by one or more roller bearings, may extend through the spider 176 of the interaxle differential unit 26, may be fixedly coupled to the second side gear 222 of the interaxle differential unit 26 at a first end, and may be fixedly coupled to the output yoke 78 at a second end. In this configuration, the output shaft 500 may not extend through a drive pinion, but instead may be disposed in or may extend through the drive gear 502. In addition, the output shaft 500 may have an output shaft spline 510. The output shaft spline 510 may include a plurality of teeth that may be disposed substantially parallel to the first axis 80 and may mate with a corresponding spline on the clutch collar 508.

The drive gear 502 may be operatively connected to the interaxle differential unit 26. For example, the drive gear 502 may receive torque from the third side gear 224 of the interaxle differential unit 26. In at least one configuration, the drive gear 502 may have a center bore through which the output shaft 500 may extend. In addition, the drive gear 502 may include a drive gear portion 520, a first hub 522, and a second hub 524.

The drive gear portion 520 may include a plurality of teeth that may be disposed opposite the center bore. The teeth of the drive gear portion 520 may mesh with teeth of the driven gear 504.

The first hub 522 may extend axially from the drive gear portion 520. For example, the first hub 522 may extend axially toward the interaxle differential unit 26. The first hub 522 may at least partially define the center bore and may be fixedly coupled to the third side gear 224 of the interaxle differential unit 26. For instance, the first hub 522 may include a first hub spline 530 that may be received in the third side gear 224 and that may mate with a corresponding spline of the third side gear 224. As such, the third side gear 224 may be inhibited from rotating with respect to the drive gear 502. The first hub 522 may also facilitate mounting of the drive gear 502. For example, the first hub 522 may be received in a roller bearing assembly 532 that may be mounted to the differential carrier 42. The roller bearing assembly 532 may be axially positioned between the drive gear portion 520 and the first hub spline 530 and may be disposed outside of the case 22 in one or more configurations.

The second hub 524 may extend axially from the drive gear portion 520 and may be disposed opposite the first hub 522. For example, the second hub 524 may extend toward the clutch collar 508. The second hub 524 may at least partially define the center bore and may the selectively engaged by the clutch collar 508. For instance, the second hub 524 may include a second hub gear 540 that may be selectively engaged by the clutch collar 508. The second hub 524 may be received in another roller bearing assembly 532 that may be mounted to the differential carrier 42. The roller bearing assembly 532 may be axially positioned between the drive gear portion 520 and the second hub gear 540. The second hub gear 540 may have teeth that may be arranged around the first axis 80, teeth that may extend axially away from the drive gear portion 520, or both The driven gear 504 may be rotatable about a third axis 550. In addition, driven gear 504 may be fixedly disposed with respect to the drive pinion 506. For example, the driven gear 504 may include a hole that may receive the drive pinion 506 such that the driven gear 504 and the drive pinion 506 are rotatable together about the third axis 550. The driven gear 504 may include a plurality of teeth that may be arranged around the third axis 550 and that may mesh with teeth of the drive gear portion 520 of the drive gear 502.

The drive pinion 506 may be rotatable about the third axis 550 and may provide torque to the ring gear 100. The drive pinion 506 may be rotatably supported by one or more roller bearing assemblies 552 that may be disposed on the differential carrier 42. The drive pinion 506 may include a shaft portion 554 and a gear portion 556. The shaft portion 554 may extend from the driven gear 504 to the gear portion 556. The gear portion 556 may be disposed at an end of the shaft portion 554 and may have a plurality of teeth that may mesh with corresponding teeth on the ring gear 100.

The clutch collar 508, which may also be referred to as a second coupling, may provide similar functionality as the clutch collar 220 previously described. The clutch collar 508 may be movable with respect to the output shaft 500 along the first axis 80 between an unlocked position and a locked position. For example, the clutch collar 508 may have a clutch collar hole that may receive the output shaft 500. A clutch collar spline 560 that may be disposed in the clutch collar hole that may mate with the output shaft spline 510. The mating splines may allow the clutch collar 508 to move in an axial direction or along the first axis 80 while inhibiting rotation of the clutch collar 508 with respect to the output shaft 500. A clutch collar gear 562 may facilitate coupling of the clutch collar 508 to the drive gear 502. For example, the clutch collar gear 562 may be selectively engageable with the second hub gear 540. In FIG. 12, the clutch collar gear 562 is depicted with teeth that are arranged around the first axis 80 and that may extend around the second hub gear 540; however, it is contemplated that the clutch collar gear 562 may be configured as a face gear that may have teeth that may extend axially toward the drive gear 502. The clutch collar 508 may also have a clutch collar groove 234 that may facilitate coupling of the clutch collar 508 to the second actuator 570 as previously described.

In FIG. 12, the clutch collar 508 is disposed in an unlocked position in which the clutch collar 508 does not couple the drive gear 502 to the output shaft 500. As such, the output shaft 500 may rotate at a different velocity with respect to the third side gear 224 and the drive gear 502. In addition, the input shaft 72 and the output shaft 500 may be permitted to rotate at different velocities with respect to each other when the clutch collar 508 is in the unlocked position.

In FIG. 13, the clutch collar 508 is disposed in a locked position in which the clutch collar 508 couples the drive gear 502 to the output shaft 500. As such, the output shaft 500, third side gear 224, and the drive gear 502 may rotate together about the first axis 80. In addition, the input shaft 72 and the output shaft 500 may be inhibited or prevented from rotating at different velocities with respect to each other when the clutch collar 508 is in the locked position.

Referring to FIGS. 14-25, additional configurations of gear reduction units that may include or may be configured as a planetary gear set are shown. These configurations may be employed with axle assemblies in which the output shaft extends through a drive pinion, such as is shown in FIG. 2 or with an axle assembly configuration in which the output shaft does not extend through a drive pinion, such as is shown in FIG. 12. It is also contemplated that double planetary gear sets may be provided with any of the gear reduction units having a planetary gear sets described herein.

Figure 14:
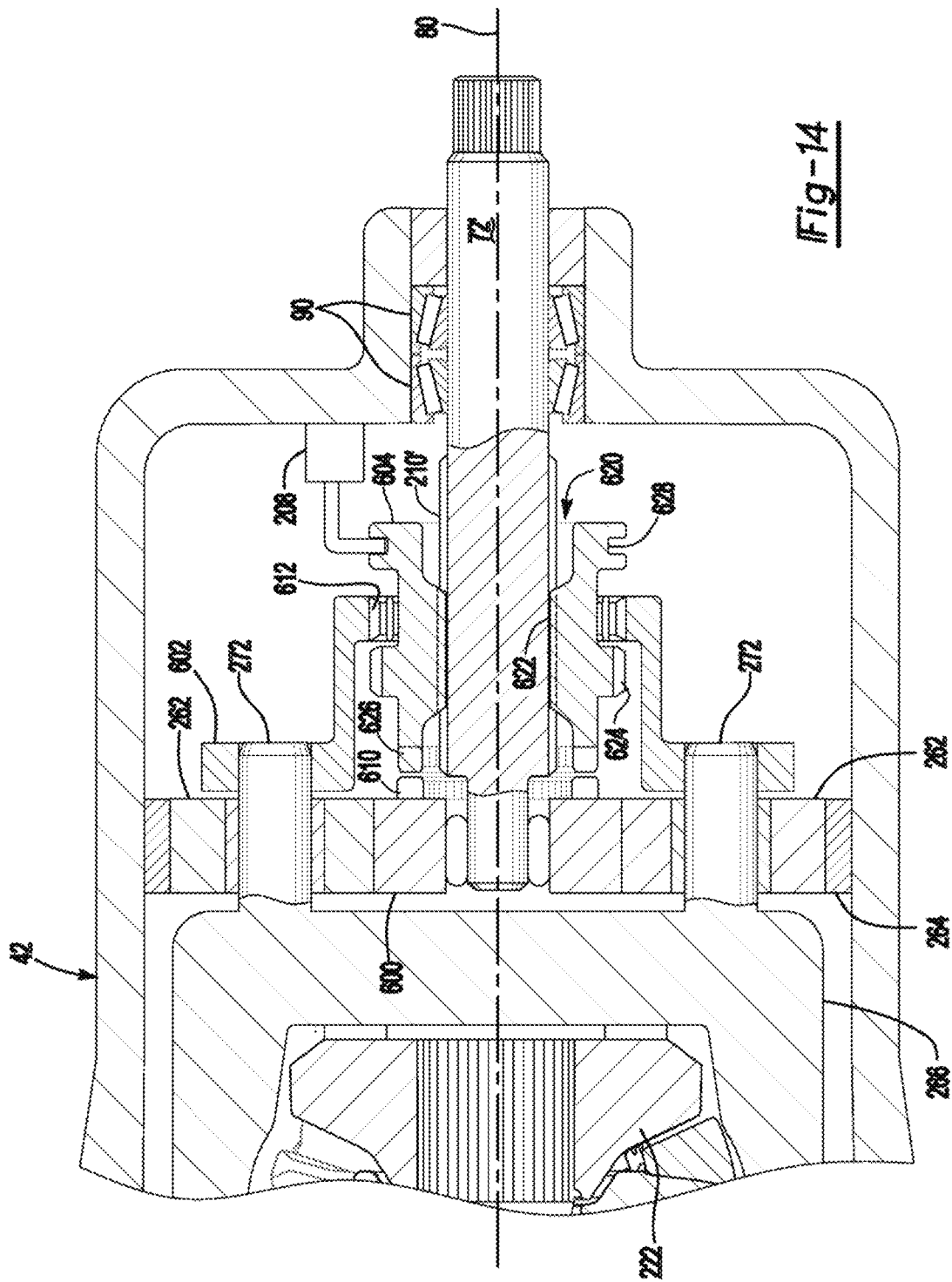
FIGS. 14-16 are section views of an embodiment that includes a gear reduction unit having a planetary gear set and illustrates a first coupling in neutral, first and second positions, respectively.
Figure 15:
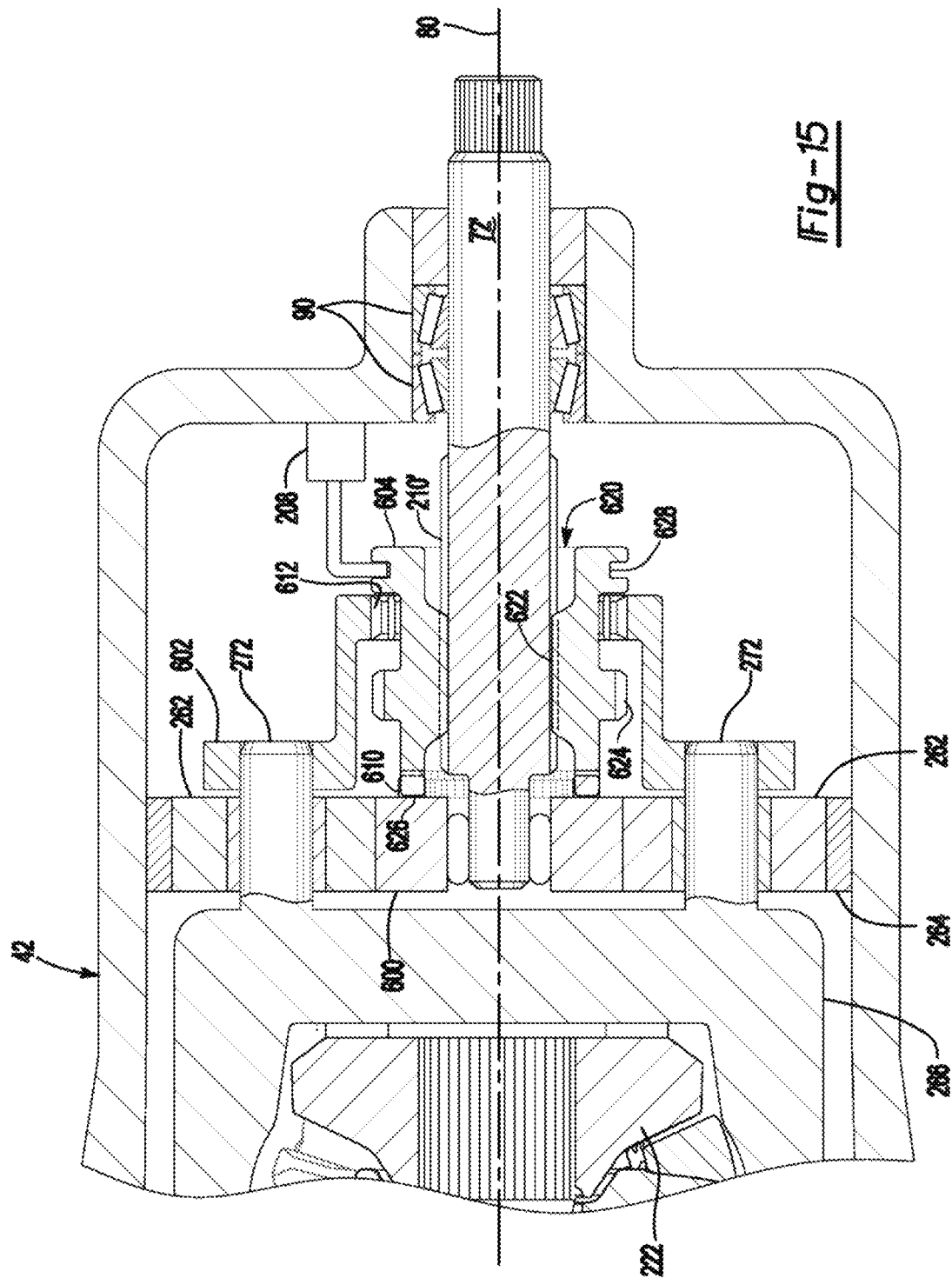
Figure 16:
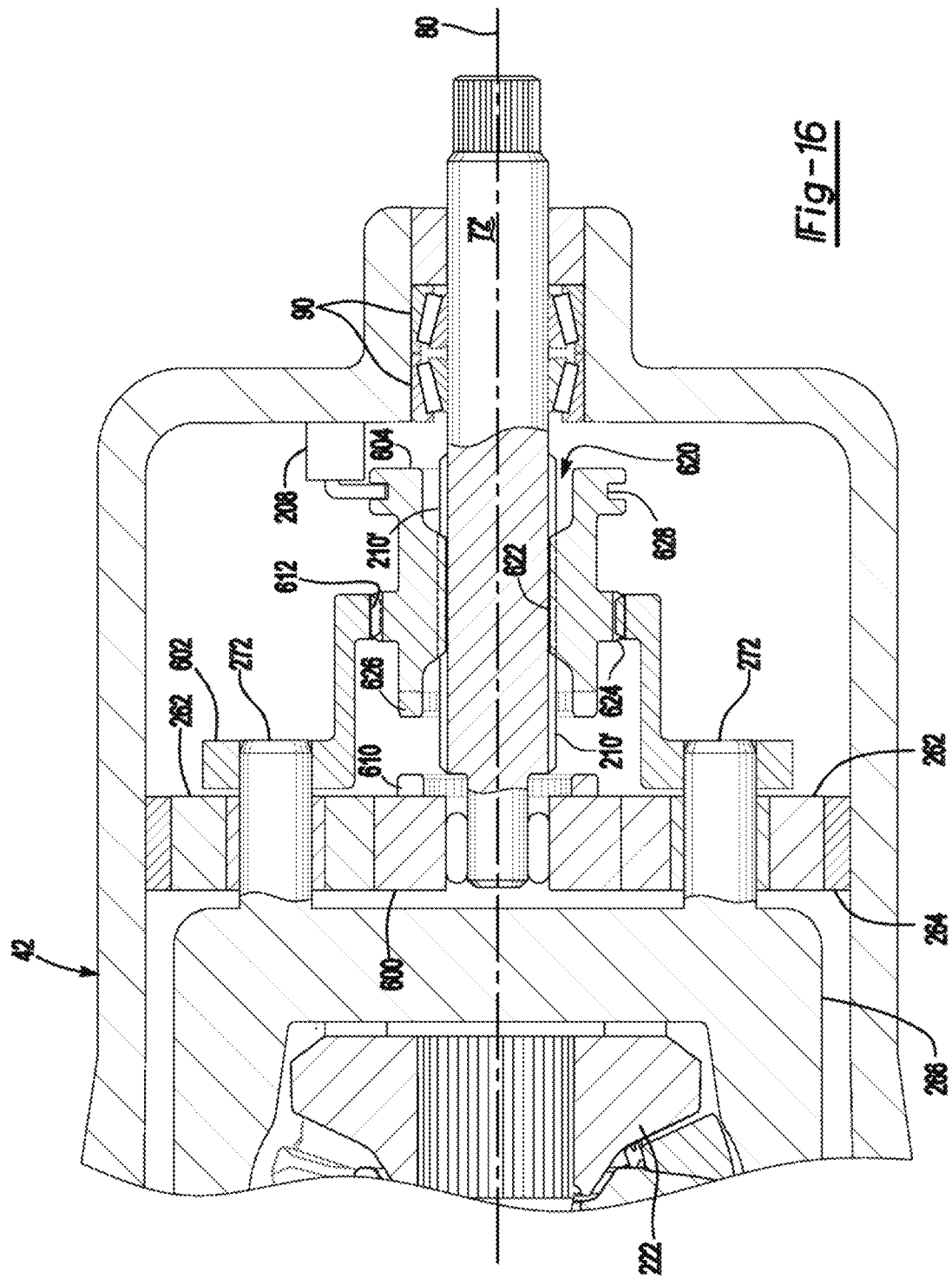

Referring to FIGS. 14-16, a gear reduction unit is shown that may have planet pinions 262, a planetary ring gear 264, and planet carrier 266 as previously described. The gear reduction unit may also include a sun gear 600, a planet carrier ring 602, and a first coupling 604.

The sun gear 600 may be disposed proximate the center of the planetary gear set and may be rotatable about the first axis 80. The sun gear 600 have a hole that may receive the input shaft 72'. The sun gear 600 may have teeth that may mesh with the planet pinions 262 and may have a gear 610 that may be selectively coupled to the first coupling 604. More specifically, the gear 610 may be a face gear that may have a plurality of teeth that may be arranged around the first axis 80 and that may extend in an axial direction away from the case 22.

The planet carrier ring 602, which may also be referred to as an outer planet carrier, may extend around the first axis 80 and the sun gear 600. The planet carrier ring 602 may be fixedly disposed on the planet carrier 266. For example, the planet carrier ring 602 may be fixedly disposed on the pins 272 of the planet carrier 266. The planet carrier ring 602 may have a set of planet carrier ring teeth 612 that may be arranged around the first axis 80 and that may extend toward the first coupling 604. The planet carrier ring teeth 612 may be disposed closer to the first axis 80 than the pins 272.

The first coupling 604, which may also be referred to as a first collar, may be movably disposed on the input shaft 72'. The first coupling 604 may have a coupling hole 620, a first coupling spline 622, a second coupling spline 624, a coupling gear 626, and a coupling groove 628.

The coupling hole 620 may extend through the first coupling 604 and may extend around the first axis 80. The coupling hole 620 may receive the input shaft 72'.

The first coupling spline 622 may extend into the coupling hole 620 and toward the first axis 80. The first coupling spline 622 may mate with the input shaft spline 210'. The mating splines may allow the first coupling 604 to move in an axial direction while inhibiting rotation of the first coupling 604 about the first axis 80 with respect to the input shaft 72'.

The second coupling spline 624 may be disposed opposite the first coupling spline 622. As such, the second coupling spline 624 may extend away from the first axis 80. The second coupling spline 624 may be selectively engageable with the planet carrier ring teeth 612. The second coupling spline 624 may have an axial length that may be less than an axial length of the first coupling spline 622.

The coupling gear 626 may be disposed at an end of the first coupling 604 that may face toward the sun gear 600. The coupling gear 626 may include a plurality of teeth that may be arranged around the first axis 80. The teeth may be selectively engageable with the gear 610 of the sun gear 600.

The coupling groove 628 may have a similar configuration or the same configuration as coupling groove 206'. As such, the coupling groove 628 may facilitate coupling of the first coupling 604 to the first actuator 208.

In FIG. 14, the first coupling 604 is shown in a neutral position. In the neutral position, the first coupling 604 may not couple the input shaft 72' to the sun gear 600 or to the planet carrier ring 602.

In FIG. 15, the first coupling 604 is shown in a first position in which the first coupling 604 couples the input shaft 72' to the sun gear 600. For example, the coupling gear 626 may mate with the gear 610 of the sun gear 600. As such, the sun gear 600 may rotate with the input shaft 72' about the first axis 80 while the planet pinions 262 and the planet carrier 266 (and hence the case 22) may rotate with respect to the sun gear 600. Accordingly, torque may be transmitted from the input shaft 72' to the sun gear 600 and then to the planet carrier 266 via the planet pinions 262, thereby allowing the planetary gear set to provide gear reduction associated with the first drive gear ratio.

In FIG. 16, the first coupling 604 is shown in a second position in which the first coupling 604 couples the input shaft 72' to the planet carrier ring 602. For example, the second coupling spline 624 may mate with the planet carrier ring teeth 612. As such, the sun gear 600 may be free to rotate about the first axis 80 with respect to the input shaft 72' while the planet carrier 266 and the input shaft 72' may rotate together about the first axis 80. Accordingly, torque may be transmitted from the input shaft 72' to the planet carrier 266 and the case 22, thereby allowing the planetary gear set to provide gear reduction associated with the second drive gear ratio.

Figure 17:
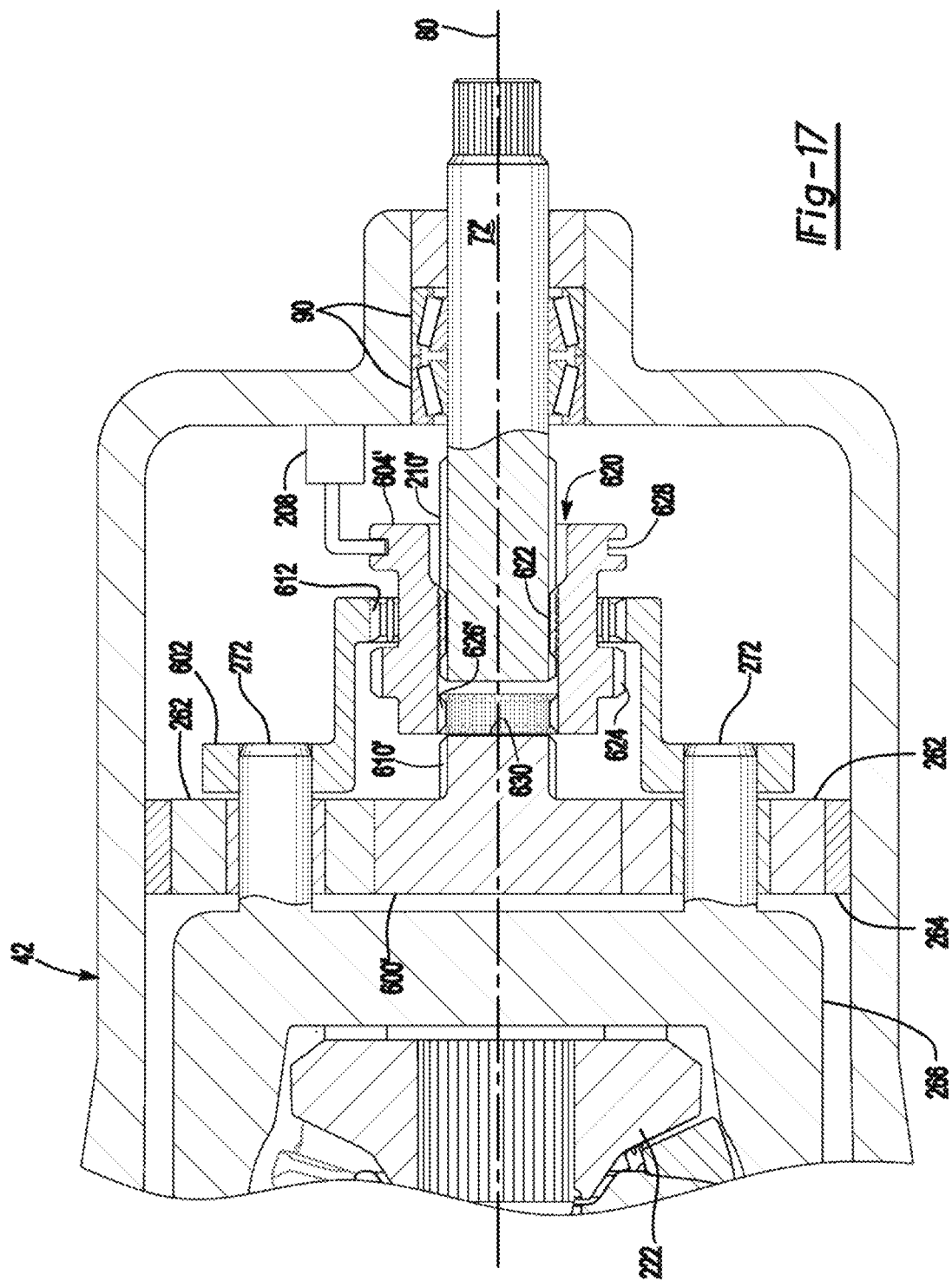
FIGS. 17-19 are section views of an embodiment that includes a gear reduction unit having a planetary gear set and illustrates a first coupling in neutral, first and second positions, respectively.
Figure 18:
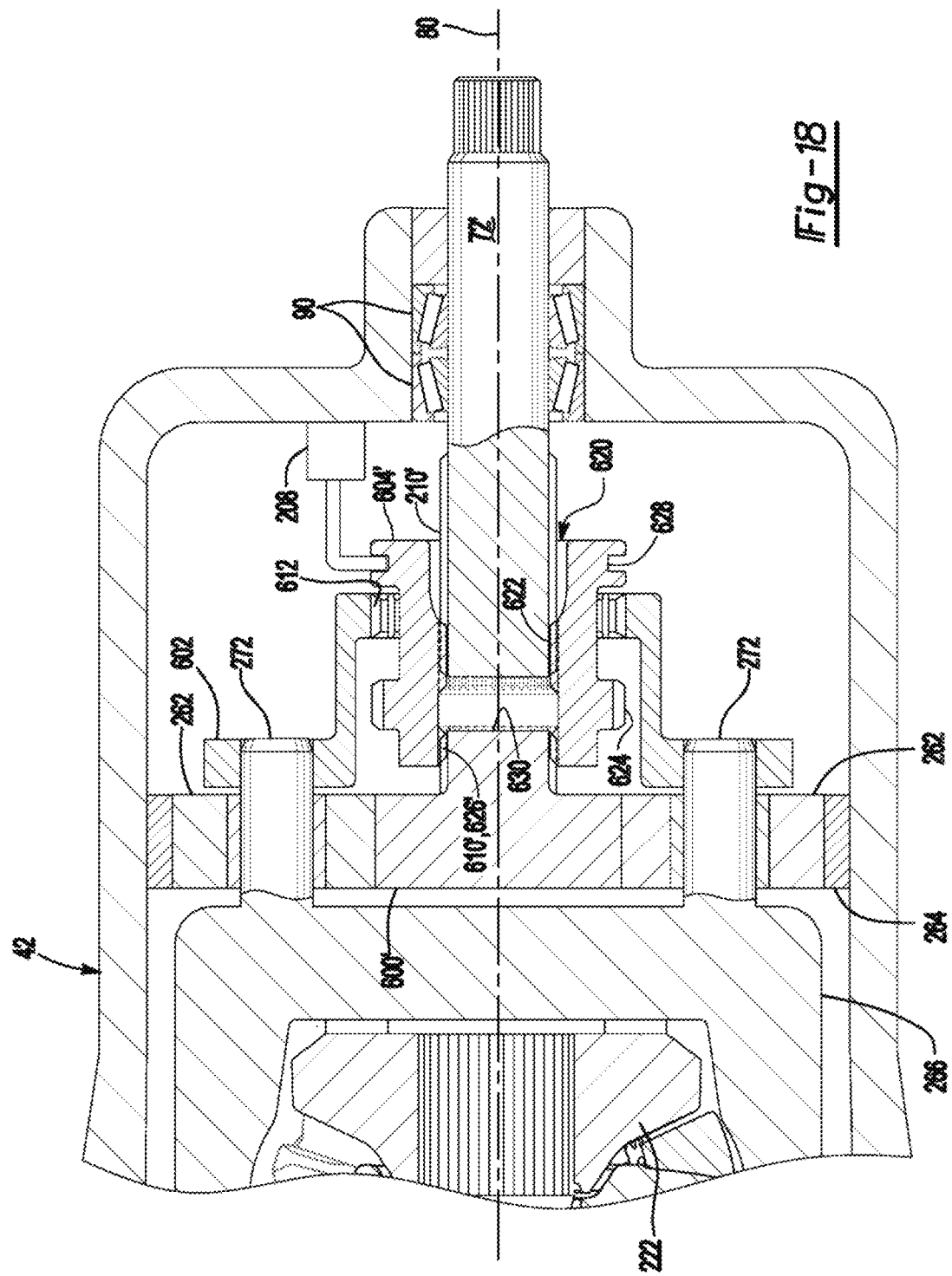
Figure 19:
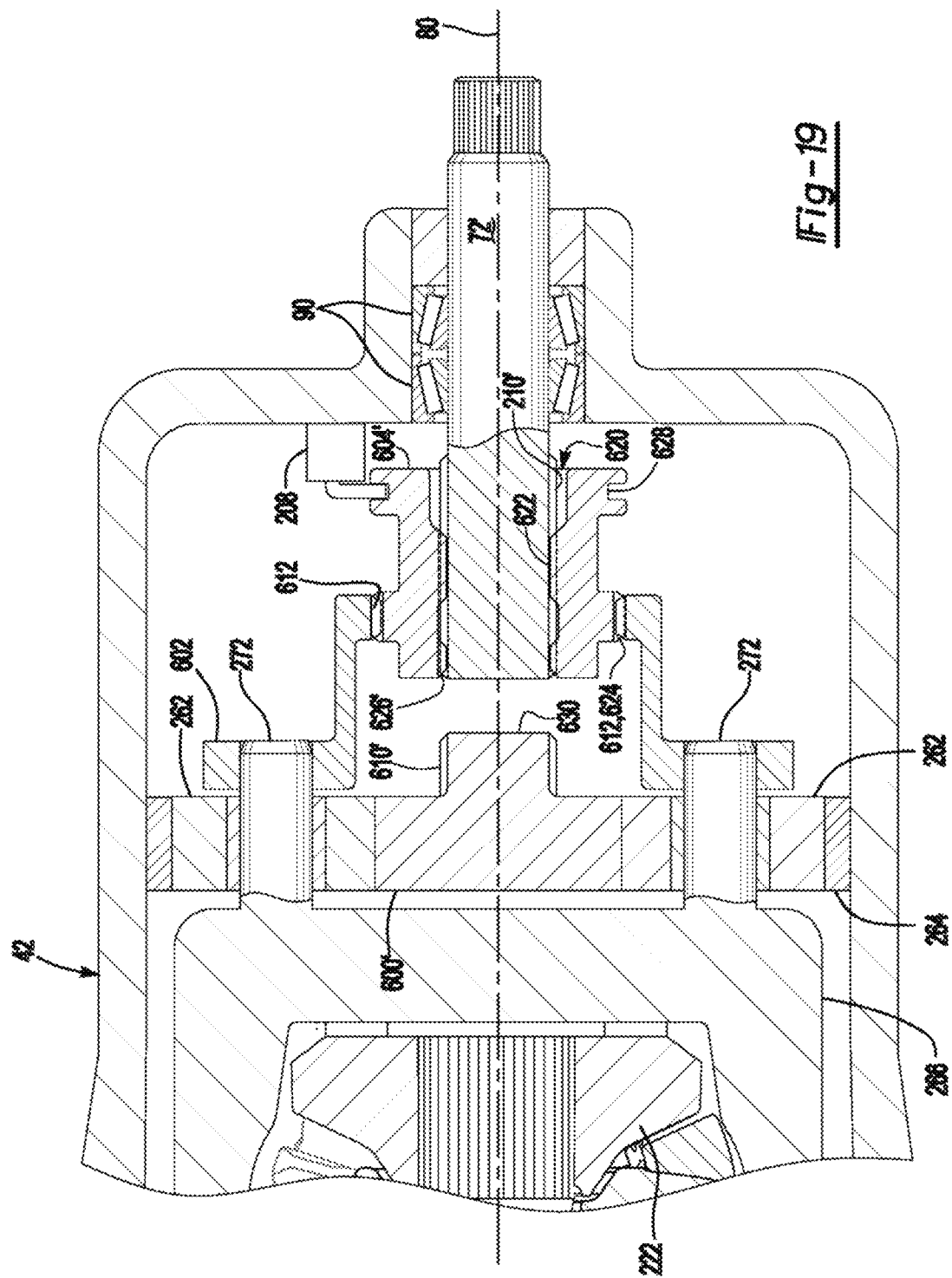

Referring to FIGS. 17-19, a gear reduction unit is shown that may have planet pinions 262, a planetary ring gear 264, a planet carrier 266, and a planet carrier ring 602 as previously described. This configuration may differ from that shown in FIGS. 14-16 in configuration of the sun gear and the first coupling.

The sun gear 600' may have the similar configuration as sun gear 600 but may have a gear 610' that is not be a face gear. Instead the gear 610' may have an annular hub 630 that may extend from a lateral side of the sun gear 600' in a direction that extends axially away from the planet carrier 266. The teeth of the gear 610' may be arranged around the annular hub 630 and may extend radially away from the first axis 80. The sun gear 600' may be fixedly disposed on the input shaft 72'.

The first coupling 604' may have the same configuration as first coupling 604, except that the coupling gear 626' may not be a face gear. Instead the coupling gear 626' may be disposed in the coupling hole 620 and may have teeth that may be arranged around the first axis 80 and that may extend radially toward the first axis 80.

In FIG. 17, the first coupling 604' is shown in a neutral position. In the neutral position, the first coupling 604' may not couple the input shaft 72' to the sun gear 600' or to the planet carrier ring 602.

In FIG. 18, the first coupling 604' is shown in a first position in which the first coupling 604' couples the input shaft 72' to the sun gear 600'. For example, the coupling gear 626' may mate with the gear 610' of the sun gear 600'. As such, the sun gear 600' may rotate with the input shaft 72' about the first axis 80 while the planet pinions 262 and the planet carrier 266 (and hence the case 22) may rotate with respect to the sun gear 600'. Accordingly, torque may be transmitted from the input shaft 72' to the sun gear 600' and then to the planet carrier 266 via the planet pinions 262, thereby allowing the planetary gear set to provide gear reduction associated with the first drive gear ratio.

In FIG. 19, the first coupling 604' is shown in a second position in which the first coupling 604' couples the input shaft 72' to the planet carrier ring 602. For example, the second coupling spline 624 may mate with the planet carrier ring teeth 612. As such, the sun gear 600' may be free to rotate about the first axis 80 with respect to the input shaft 72' while the planet carrier 266 and the input shaft 72' may rotate together about the first axis 80. Accordingly, torque may be transmitted from the input shaft 72' to the planet carrier 266 and the case 22, thereby allowing the planetary gear set to provide gear reduction associated with the second drive gear ratio.

Figure 20:
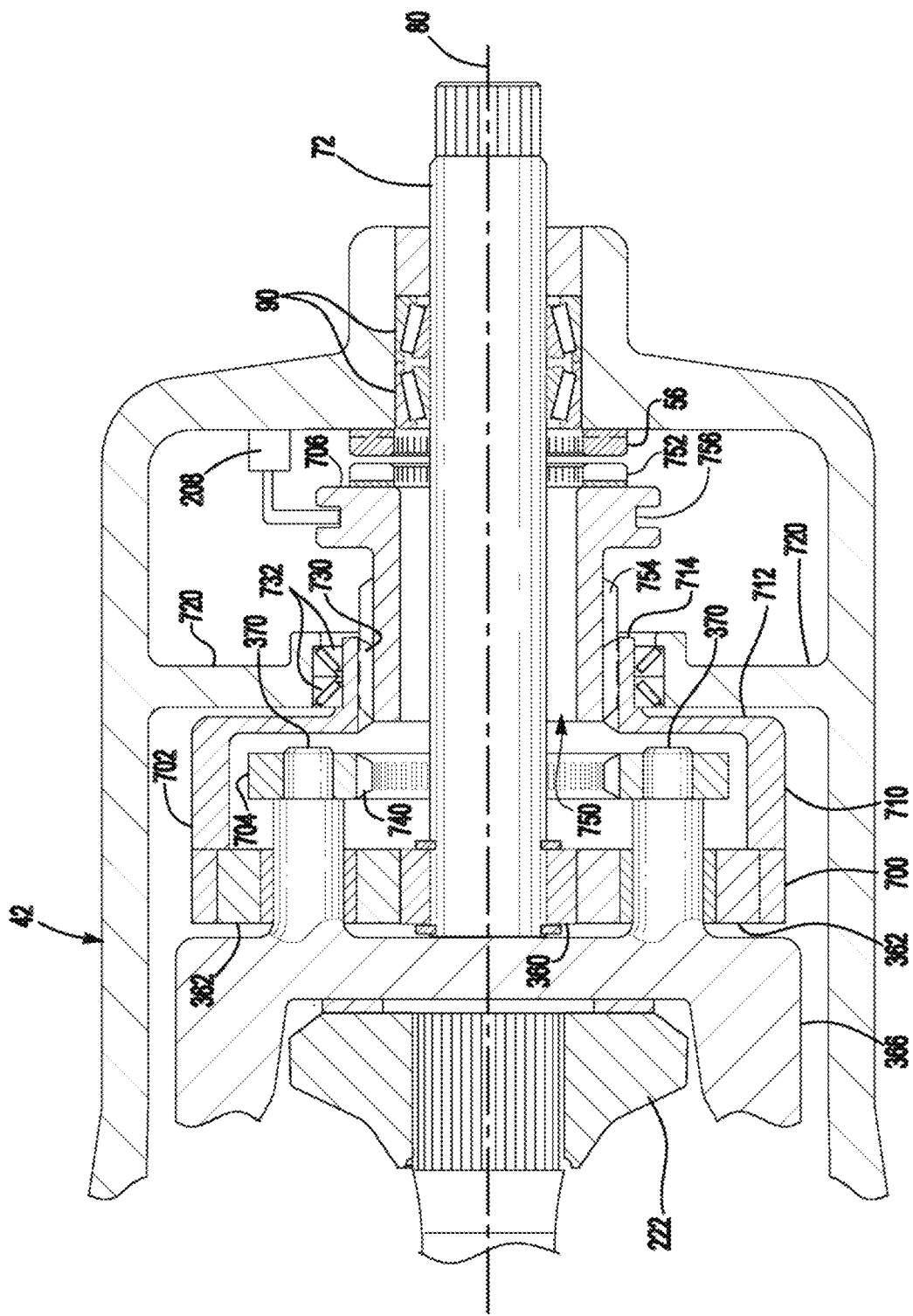
FIGS. 20-22 are section views of an embodiment that includes a gear reduction unit having a planetary gear set and illustrates a first coupling in neutral, first and second positions, respectively.
Figure 21:
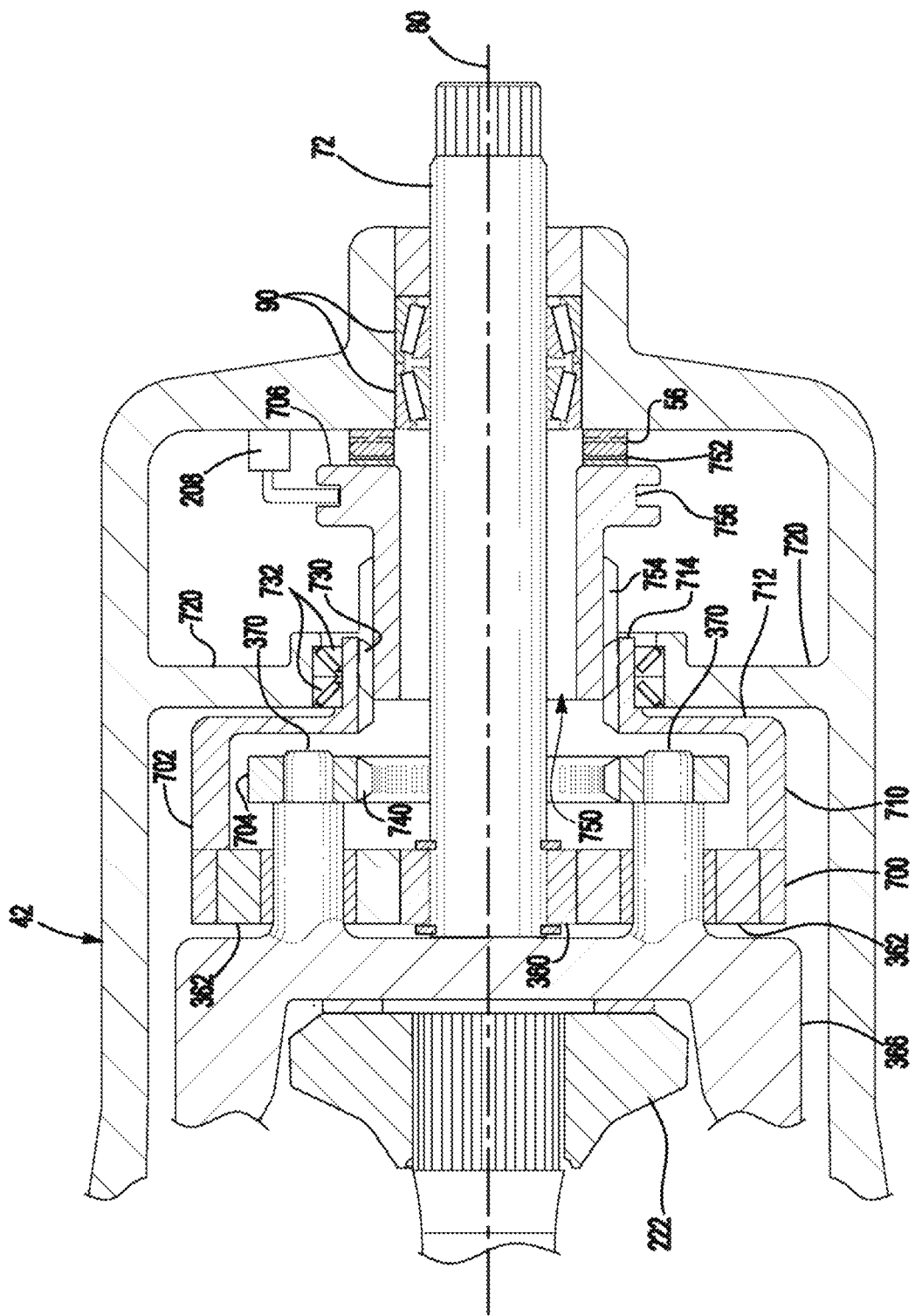
Figure 22:
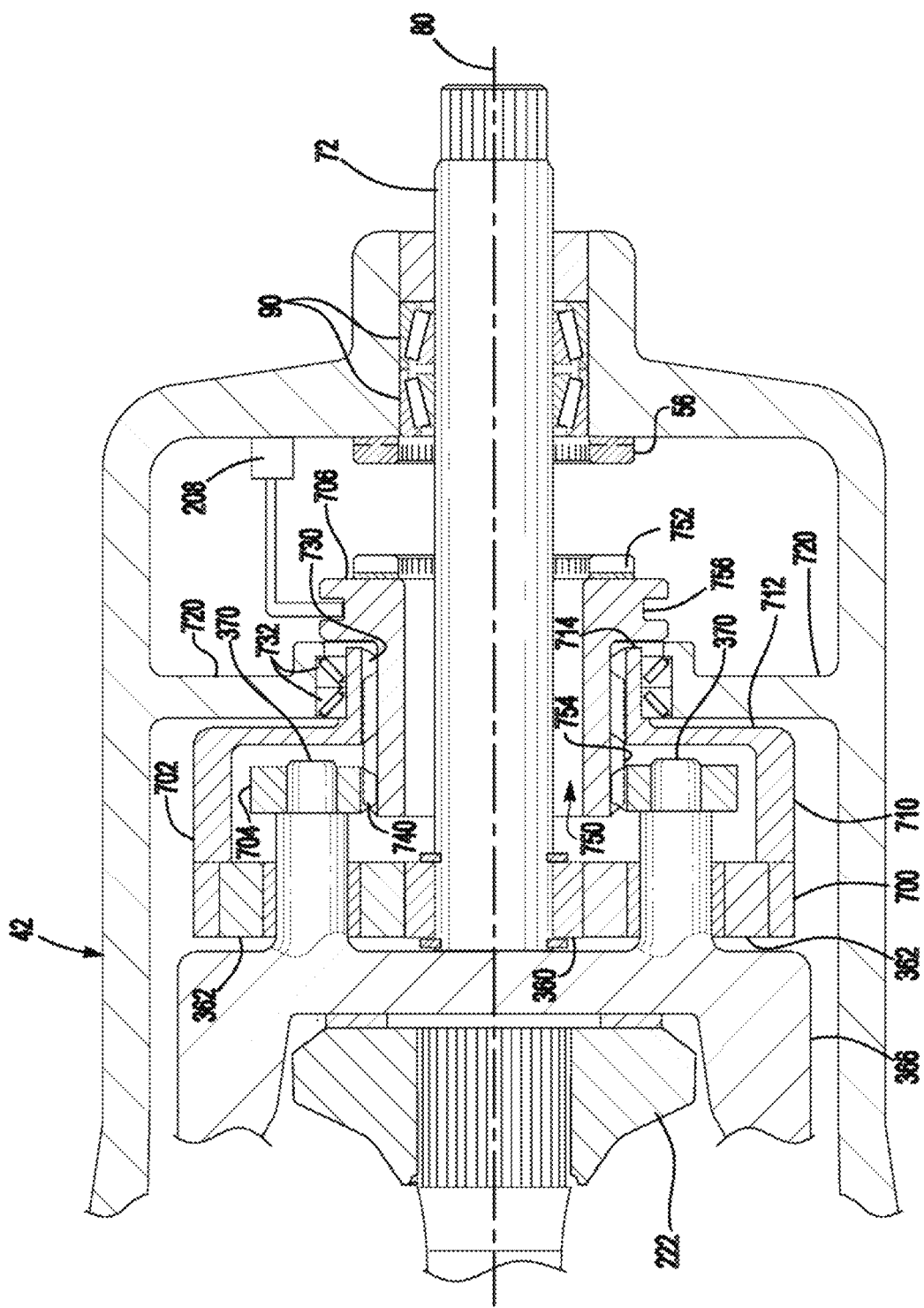

Referring to FIGS. 20-22, a gear redaction unit is shown that may have a sun gear 360, planet pinions 362, and a planet carrier 366 as previously described. The gear reduction unit may also include a planetary ring gear 700, a support flange 702, a planet carrier ring 704, and a first coupling 706.

The planetary ring gear 700 may extend around the first axis 80 and may receive the planet pinions 362. The planetary ring gear 700 may include a plurality of teeth that may extend toward the first axis 80 and may mesh with teeth on the planet pinions 362. The planetary ring gear 700 may be rotatable with respect to the housing assembly 20 and the first axis 80. As such, the planetary ring gear 700 may be spaced apart from the housing assembly 20. Unlike the configuration shown in FIGS. 8-11, the planetary ring gear 700 may not move axially along the first axis 80.

The support flange 702 may be fixedly disposed with respect to the planetary ring gear 700. The support flange 702 may be provided as a separate component from the planetary ring gear 700 or may be integrally formed with the planetary ring gear 700. The support flange 702 may extend around the first axis 80 and may receive the first coupling 706. In addition, the support flange 702 may be disposed on a side of the planetary ring gear 700 that is disposed opposite the case 22. In at least one configuration, the support flange 702 may include an outer wall 710, an intermediate wall 712, and an inner wall 714.

The outer wall 710 may extend from the planetary ring gear 700. The outer wall 710 may be radially disposed with respect to the first axis 80.

The intermediate wall 712 may extend from an end of the outer wall 710 to an end of the inner wall 714. Moreover, the inner wall 714 may be disposed substantially perpendicular to the first axis 80 in one or more configurations. The intermediate wall 712 may be axially positioned between the planet carrier 366 and a support 720 that may extend from the differential carrier 42.

The inner wall 714 may extend from the intermediate wall 712. The inner wall 714 may be radially disposed with respect to the first axis 80. In addition, the inner wall 714 may be disposed closer to the first axis 80 than the outer wall 710. The inner wall 714 may receive the first coupling 706 and may include a set of support flange teeth 730 that may be arranged around the first axis 80 and that may extend toward the first coupling 706. The support flange teeth 730 may be disposed closer to the first axis 80 than the pins 372 of the planet carrier 366. One or more roller bearing assemblies 732 may be disposed on a side of the inner wall 714 that may be disposed opposite the support flange teeth 730. The roller bearing assemblies 732 may rotatably support the support flange 702. In at least one configurator one or more roller bearing assembly 732 may extend from the inner wall 714 to the support 720 of the differential carrier 42.

The planet carrier ring 704, which may also be referred to as an outer planet carrier, may extend around the first axis 80 and the input shaft 72. The planet carrier ring 704 may be fixedly disposed on the planet carrier 366. For example, the planet carrier ring 704 may be fixedly disposed on the pins 372 of the planet carrier 366. The planet carrier ring 704 may have a set of planet carrier ring teeth 740 that may be arranged around the first axis 80 and that may extend toward the first coupling 706. The planet carrier ring teeth 740 may be disposed closer to the first axis 80 than the pins 372.

The first coupling 706, which may also be referred to as a first collar, may be movable along the first axis 80. The first coupling 706 may have a coupling hole 750, a coupling gear 752, a coupling spline 754, and a coupling groove 756.

The coupling hole 750 may extend through the first coupling 706 and may extend around the first axis 80. The coupling hole 750 may receive and may be spaced apart from the input shaft 72.

The coupling gear 752 may be disposed at an end of the first coupling 706 that is disposed opposite the case 22. The coupling gear 752 may have a set of teeth that may be arranged around the first axis 80 and that may extend in an axial direction away from the case 22.

The coupling spline 754 may be disposed opposite the coupling hole 750. As such, the coupling spline 754 may have teeth that may extend away from the first axis 80. The coupling spline 754 may mate with the support flange teeth 730 of the support flange 702. In addition, the coupling spline 754 may selectively mate with the planet carrier ring teeth 740 of the planet carrier ring 704.

The coupling groove 756 may have a similar configuration or the same configuration as coupling groove 206'. As such, the coupling groove 756 may facilitate coupling of the first coupling 706 to the first actuator 208.

In FIG. 20, the first coupling 706 is shown in a neutral position. In the neutral position, the first coupling 706 may not couple the planetary ring gear 700 to the case 22 or the planet carrier 366.

In FIG. 21, the first coupling 706 is shown in a first position in which the first coupling 706 couples the planetary ring gear 700 to the case 22. For example, the coupling gear 752 may mate with the housing face gear 56. As such, the planetary ring gear 700 may not rotate about the first axis 80 with respect to the housing assembly 20 and the planet pinions 362 may be rotatable with respect to the sun gear 360. Accordingly, torque may be transmitted from the input shaft 72 to the sun gear 360, planet pinions 362 and to the planet carrier 366 (and hence the case 22), thereby allowing the planetary gear set to provide gear reduction associated with the first drive gear ratio.

In FIG. 22, the first coupling 706 is shown in a second position in which the first coupling 706 couples the planetary ring gear 700 to the planet carrier 366. For example, the coupling spline 754 may mate with the planet carrier ring teeth 740 of the planet carrier 366. As such, the planetary ring gear 700 may not rotate with respect to the planet carrier 366 and the planet pinions 362 may not rotate with respect to the planet carrier 366 and the planetary ring gear 700. Thus, the sun gear 360, planet carrier 366, and the planetary ring gear 700 may rotate together about the first axis 80. Accordingly, torque may be transmitted from the input shaft 72 to the case 22, thereby allowing the planetary gear set to provide gear reduction associated with the second drive gear ratio.

Figure 23:
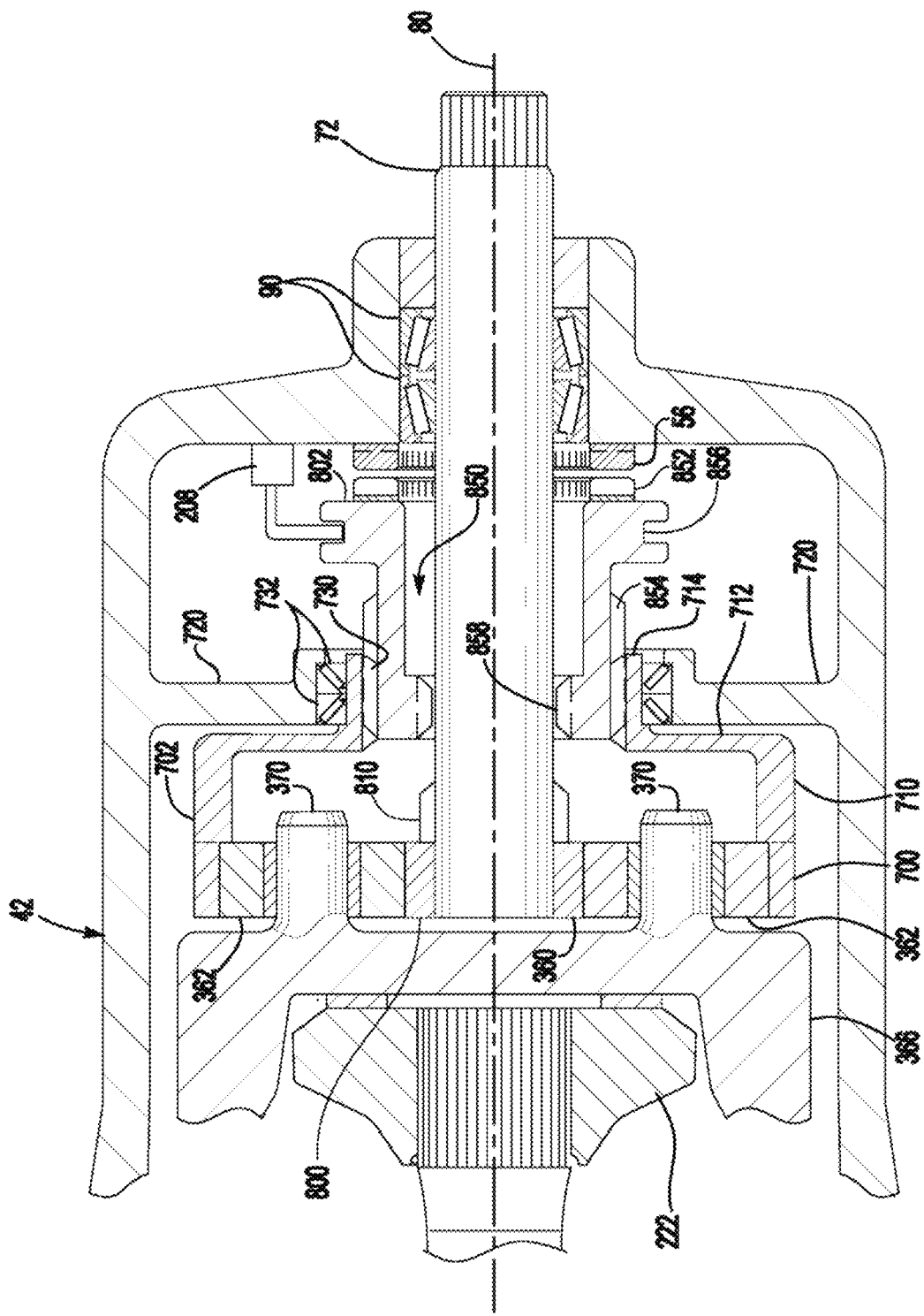
FIGS. 23-25 are section views of an embodiment that includes a gear reduction unit having a planetary gear set and illustrates a first coupling in neutral, first and second positions, respectively.
Figure 24:
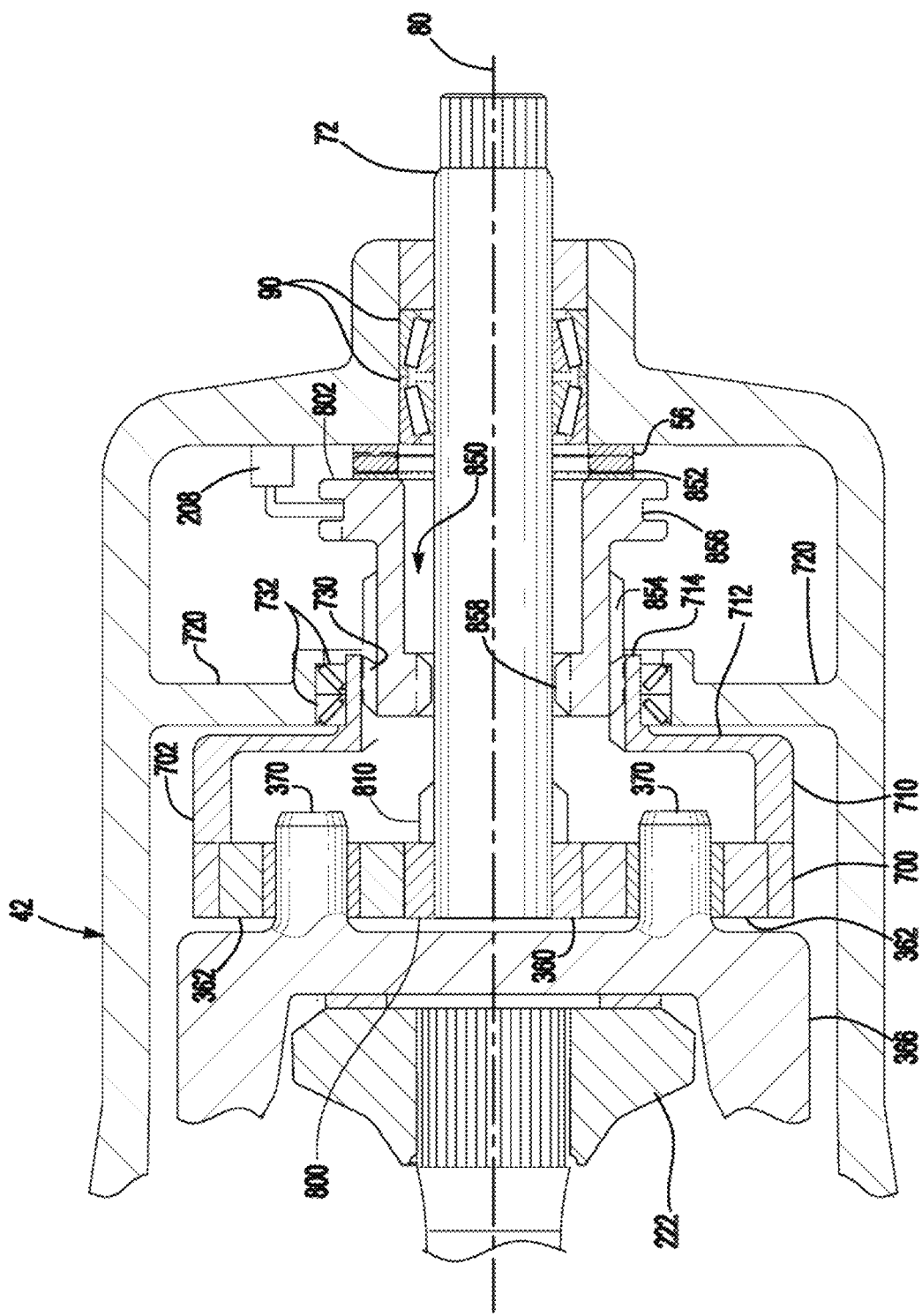
Figure 25:
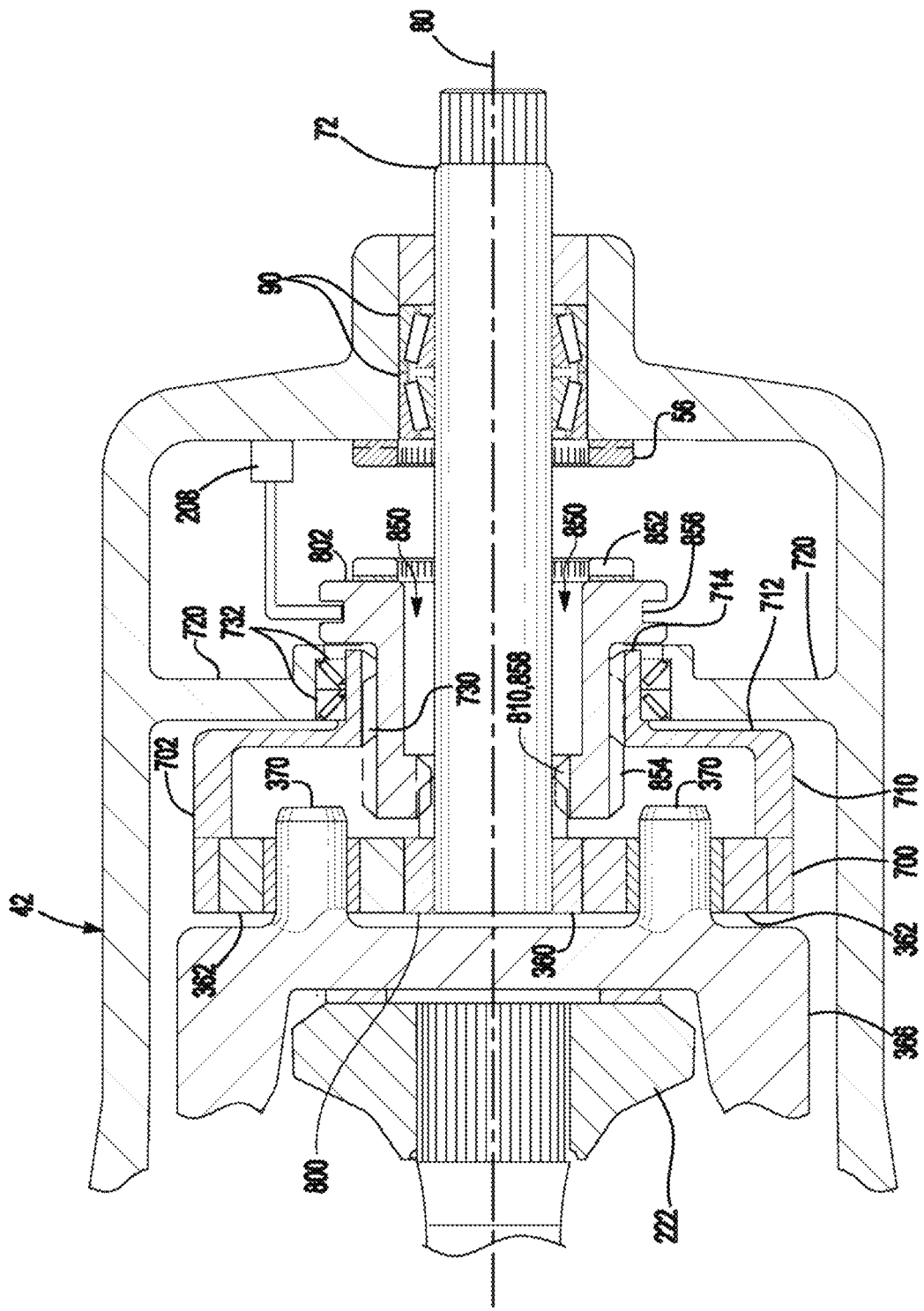

Referring to FIGS. 23-25, a gear reduction unit is shown that may have planet pinions 362, a planet carrier 366, a planetary ring gear 700, and a support flange 702 as previously described. The gear reduction unit may also include a sun gear 800 and a first coupling 802.

The sun gear 800 may be fixedly positioned with respect to the input shaft 72. The sun gear 800 may be integrally formed with the input shaft 72 or may be provided as a separate component. The sun gear 800 may have teeth that may mesh with teeth of the planet pinions 362 as previously described. In addition, a gear 810 may be provided with the sun gear 800, the input shaft 72, or both that may be selectively coupled to the first coupling 802. For example, the gear 810 may be a face gear that may have a plurality of teeth that may be arranged around the first axis 80 and that may extend in an axial direction away from the case 22.

The first coupling 802 may be movable along the first axis 80. The first coupling 802 may have a coupling hole 850, a first coupling gear 852, a coupling spline 854, a coupling groove 856, and a second coupling gear 858.

The coupling hole 850 may extend through the first coupling 802 and may extend around the first axis 80. The coupling hole 850 may receive and may be spaced apart from the input shaft 72.

The first coupling gear 852 may be disposed at an end of the first coupling 802 that is disposed opposite the case 22. The first coupling gear 852 may have a set of teeth that may be arranged around the first axis 80 and that may extend in an axial direction away from the case 22.

The coupling spline 854 may be disposed opposite the coupling hole 850. As such, the coupling spline 854 may have teeth that may extend away from the first axis 80. The coupling spline 854 may mate with the support flange teeth 730 of the support flange 702. In addition, the coupling spline 854 may selectively mate with the gear 810.

The coupling groove 856 may have a similar configuration or the same configuration as coupling groove 756. As such, the coupling groove 856 may facilitate coupling of the first coupling 802 to the first actuator 208.

The second coupling gear 858 may be disposed at an end of the first coupling 802 that is disposed opposite the first coupling gear 852. The second coupling gear 858 may have a set of teeth that may be arranged around the first axis 80 and that may extend radially toward the first axis 80.

In FIG. 23, the first coupling 802 is shown in a neutral position. In the neutral position, the first coupling 802 may not couple the planetary ring gear 700 to the case 22, the input shaft 72, or the sun gear 800.

In FIG. 24, the first coupling 802 is shown in a first position in which the first coupling 802 couples the planetary ring gear 700 to the case 22. For example, the first coupling gear 852 may mate with the housing face gear 56. As such, the planetary ring gear 700 may not rotate about the first axis 80 with respect to the housing assembly 20 and the planet pinions 362 may be rotatable with respect to the sun gear 800. Accordingly, torque may be transmitted from the input shaft 72 to the sun gear 800, planet pinions 362, and to the planet carrier 366 (and hence the case 22), thereby allowing the planetary gear set to provide gear reduction associated with the first drive gear ratio.

In FIG. 25, the first coupling 802 is shown in a second position in which the first coupling 802 couples the planetary ring gear 700 to the gear 810. For example, the second coupling gear 858 may mate with the gear 810. As such, the planetary ring gear 700 may not rotate with respect to the input shaft 72 and the sun gear 800. Consequently, the planet pinions 362 may not rotate with respect to the planet carrier 366 and the planetary ring gear 700. Thus, the sun gear 800, planet carrier 366, and the planetary ring gear 700 may rotate together about the first axis 80. Accordingly, torque may be transmitted from the input shaft 72 to the case 22, thereby allowing the planetary gear set to provide gear reduction associated with the second drive gear ratio.

The axle assembly configurations described above may allow an axle assembly to provide faster drive gear ratios, which may reduce the peak torque requirements of other drivetrain components, such as the transmission and driveshafts, which in turn may reduce the cost and weight of these components. Components of the gear reduction unit and the interaxle differential unit may be commonized and may be disposed in the same case in the arrangements that employ spiders, which may reduce complexity and package space. Configurations in which the gear reduction unit employs a planetary gear set may also reduce package space and may provide a greater range of gear reduction ratios.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a housing assembly that receives a differential assembly;
   an input shaft that is at least partially received in the housing assembly and is rotatable about a first axis;
   a gear reduction unit that is operatively connected to the input shaft, wherein the gear reduction unit includes a planetary gear set that has a sun gear and a planetary ring gear that are rotatable about the first axis and a planet carrier that rotatably supports a planet pinion that is in meshing engagement with the sun gear and the planetary ring gear, wherein the planetary ring gear is moveable between a first position in which the planetary ring gear is coupled to the housing assembly such that the planetary ring gear does not rotate about the first axis and a second position in which the planetary ring gear is coupled to the planet carrier such that the planet carrier and the planetary ring gear are rotatable together about the first axis; and an interaxle differential unit that is at least partially received in the planet carrier and that operatively connects the planetary gear set to the differential assembly and an output shaft.

2. The axle assembly of claim 1 wherein the planetary ring gear is moveable along the first axis between the first position, the second position, and a neutral position that is disposed between the first position and the second position, wherein torque is not transmitted from the input shaft to the planet carrier when the planetary ring gear is in the neutral position.

3. The axle assembly of claim 1 wherein the planetary gear set provides gear reduction from the input shaft to the output shaft and the differential assembly when the planetary ring gear is in the first position.

4. The axle assembly of claim 3 wherein the planetary gear set does not provide gear reduction from the input shaft to the output shaft and the differential assembly when the planetary ring gear is in the second position.

5. The axle assembly of claim 1 wherein the planetary ring gear is coupled to the housing assembly and is disengaged from the planet carrier when in the first position. and the planetary ring gear is coupled to the planet carrier and is disengaged from the housing assembly when in the second position.

6. The axle assembly of claim 5 further comprising an actuator that moves the planetary ring gear between the first position and the second position.

7. The axle assembly of claim 6 wherein the actuator includes a clutch pack that actuates the planetary ring gear to the first position and a biasing member that extends from the housing assembly to the planetary ring gear that actuates the planetary ring gear to the second position.

8. The axle assembly of claim 1 further comprising a drive pinion that provides torque to the differential assembly, is rotatable about the first axis, and is operatively connected to the interaxle differential unit, wherein the output shaft is received in the drive pinion and is rotatable about the first axis, and the interaxle differential unit operatively connects the gear reduction unit to the drive pinion and the output shaft.

9. The axle assembly of claim 8 wherein the drive pinion is rotatable with the output shaft when the interaxle differential unit is locked and the drive pinion is rotatable with respect to the output shaft when the interaxle differential unit is unlocked.

10. The axle assembly of claim 1 further comprising a drive gear that is rotatable about the first axis and is operatively connected to the interaxle differential unit, a driven gear that meshes with the drive gear and is rotatable about a third axis, and a drive pinion that is rotatable about the third axis to provides torque to the differential assembly.

11. The axle assembly of claim 1 wherein the planetary ring gear has a first planetary ring gear face gear that engages the housing assembly when the planetary ring gear is in the first position.

12. The axle assembly of claim 11 wherein the first planetary ring gear face gear is disengaged from the housing assembly when the planetary ring gear is in the second position.

13. The axle assembly of claim 1 wherein the planetary ring gear has a first planetary ring gear face gear that mates with a housing face gear of the housing assembly when the planetary ring gear is in the first position.

14. The axle assembly of claim 13 wherein the housing face gear is provided with a differential carrier of the housing assembly.

15. The axle assembly of claim 1 wherein the planetary ring gear has a second planetary ring gear face gear that is selectively engageable with the planet carrier.

16. The axle assembly of claim 15 wherein the second planetary ring gear face gear is disengaged from the planet carrier when the planetary ring gear is in the first position.

17. The axle assembly of claim 15 wherein the second planetary ring gear face gear is disengaged from a planet carrier face gear of the planet carrier when the planetary ring gear is in the first position.

18. The axle assembly of claim 15 wherein the second planetary ring gear face gear engages a planet carrier face gear of the planet carrier when the planetary ring gear is in the second position.

19. The axle assembly of claim 15 wherein the second planetary ring gear face gear is disposed opposite the first planetary ring gear face gear.

20. The axle assembly of claim 1 wherein a biasing member urges the planetary ring gear toward the second position.

* * * * *

UNITED STATES PATENT AND TRADEMARK OFFICE
CERTIFICATE OF CORRECTION

Page 1 of 1

PATENT NO. : 10,557,537 B2
APPLICATION NO. : 16/451772
DATED : February 11, 2020
INVENTOR(S) : Christopher Keeney et al.

It is certified that error appears in the above-identified patent and that said Letters Patent is hereby corrected as shown below:

In the Claims

Column 24, Line 14, Claim 10:
After "rotatable about the third axis to"
Delete "provides" and
Insert -- provide --.

Signed and Sealed this
Nineteenth Day of May, 2020

Andrei Iancu
*Director of the United States Patent and Trademark Office*